(12) United States Patent
Hashimoto et al.

(10) Patent No.: US 9,779,033 B2
(45) Date of Patent: *Oct. 3, 2017

(54) MEMORY MANAGEMENT DEVICE AND NON-TRANSITORY COMPUTER READABLE STORAGE MEDIUM

(71) Applicant: KABUSHIKI KAISHA TOSHIBA, Minato-ku (JP)

(72) Inventors: Mikio Hashimoto, Tokyo (JP); Naoko Yamada, Yokohama (JP); Ryotaro Hayashi, Hiratsuka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 95 days.

This patent is subject to a terminal disclaimer.

(21) Appl. No.: 14/744,517

(22) Filed: Jun. 19, 2015

(65) Prior Publication Data
US 2015/0370726 A1 Dec. 24, 2015

(30) Foreign Application Priority Data
Jun. 20, 2014 (JP) ................. 2014-127574

(51) Int. Cl.
*G06F 12/02* (2006.01)
*G06F 12/14* (2006.01)
(Continued)

(52) U.S. Cl.
CPC ........ *G06F 12/1416* (2013.01); *G06F 12/023* (2013.01); *G06F 12/1009* (2013.01);
(Continued)

(58) Field of Classification Search
CPC .......... G06F 12/00; G06F 12/08; G06F 12/10; G06F 12/14; G06F 12/1416; G06F 21/64; G06F 12/02
(Continued)

(56) References Cited

U.S. PATENT DOCUMENTS 4,309,569 A   1/1982 Merkle
7,031,956 B1 * 4/2006 Lee ................... G06F 17/30595
(Continued)

FOREIGN PATENT DOCUMENTS

JP    2006-202270 A    8/2006
JP    4074620 B2       4/2008
(Continued)

OTHER PUBLICATIONS

Ravi Bhargava, et al., "Accelerating Two-Dimensional Page Walks for Virtualized Systems" ASPLOS Architectural Support for Programming Languages and Operating Systems, Mar. 2008, pp. 26-35.
(Continued)

*Primary Examiner* — Tuan Thai
(74) *Attorney, Agent, or Firm* — Oblon, McClelland, Maier & Neustadt, L.L.P.

(57) ABSTRACT

In one embodiment, a storage unit stores a table tree and verifier tree. The table tree includes parent and child tables. The verifier tree includes parent and child verifiers associated with the parent and child tables, respectively. The parent verifier is used for verifying the child table and child verifier. A device stores a secure table tree corresponded to the table tree and used for address translation and a secure verifier tree corresponded to the verifier tree, to a secure storage unit. The device executes verification, based on verification information calculated based on a first child table and first child verifier in the storage unit and a first parent verifier in the secure verifier tree. The device sets the second address of the secure table tree such that the second address designates data in the first storage unit.

9 Claims, 20 Drawing Sheets

(51) Int. Cl.
G06F 21/64 (2013.01)
G06F 12/1009 (2016.01)
G06F 21/57 (2013.01)

(52) U.S. Cl.
CPC .......... *G06F 12/145* (2013.01); *G06F 21/575* (2013.01); *G06F 21/64* (2013.01); *G06F 2212/1052* (2013.01); *G06F 2221/2145* (2013.01)

(58) Field of Classification Search
USPC .................................. 711/100, 154, 162, 163
See application file for complete search history.

(56) References Cited

U.S. PATENT DOCUMENTS

| | | | |
|---|---|---|---|
| 2003/0055835 A1* | 3/2003 | Roth | G06F 19/28 |
| 2003/0223338 A1* | 12/2003 | Sasaki | G11B 7/00736 |
| | | | 369/53.21 |
| 2004/0160875 A1* | 8/2004 | Sasaki | G11B 7/00456 |
| | | | 369/53.15 |
| 2005/0033973 A1 | 2/2005 | Kamada et al. | |
| 2008/0235064 A1* | 9/2008 | Gulko | G06Q 10/087 |
| | | | 705/4 |
| 2010/0153732 A1 | 6/2010 | Su | |
| 2012/0079283 A1 | 3/2012 | Hashimoto et al. | |
| 2013/0212575 A1 | 8/2013 | Ito et al. | |
| 2015/0370727 A1 | 12/2015 | Hashimoto et al. | |

FOREIGN PATENT DOCUMENTS

| | | |
|---|---|---|
| JP | 2012-68959 A | 4/2012 |
| JP | 2012-530983 A | 12/2012 |
| JP | 2013-522702 A | 6/2013 |
| JP | 5260081 B2 | 8/2013 |
| WO | WO 2010/070959 A1 | 6/2010 |
| WO | WO 2012/160760 A1 | 11/2012 |
| WO | WO 2013/100964 A1 | 7/2013 |

OTHER PUBLICATIONS

Xiaoxin Chen, et al., "Overshadow: A Virtualization-Based Approach to Retrofitting Protection in Commodity Operating Systems" ASPLOS Architectural Support for Programming Languages and Operating Systems, Mar. 2008, pp. 2-13.

G. Edward Suh, et al., "AEGIS: Architecture for Tamper-Evident and Tamper-Resistant Processing" ICS '03 Proceedings of the 17$^{th}$ Annual International Conference on Supercomputing, Jun. 2003, pp. 357-368.

Siddhartha Chhabra, et al., "SecureME: A Hardware-Software Approach to Full System Security", Proceedings of the International Conference on Supercomputing (ICS'11), May 31, 2011, pp. 108-119.

Ryotaro Hayashi, et al., "Secure Software Development Environment DFITS (Data Flow Isolation Technology for Security)", IPSJ SIG Technical Report (vol. 2009, No. 20), Feb. 26, 2009, pp. 247-252 (with computer generated English translation).

* cited by examiner

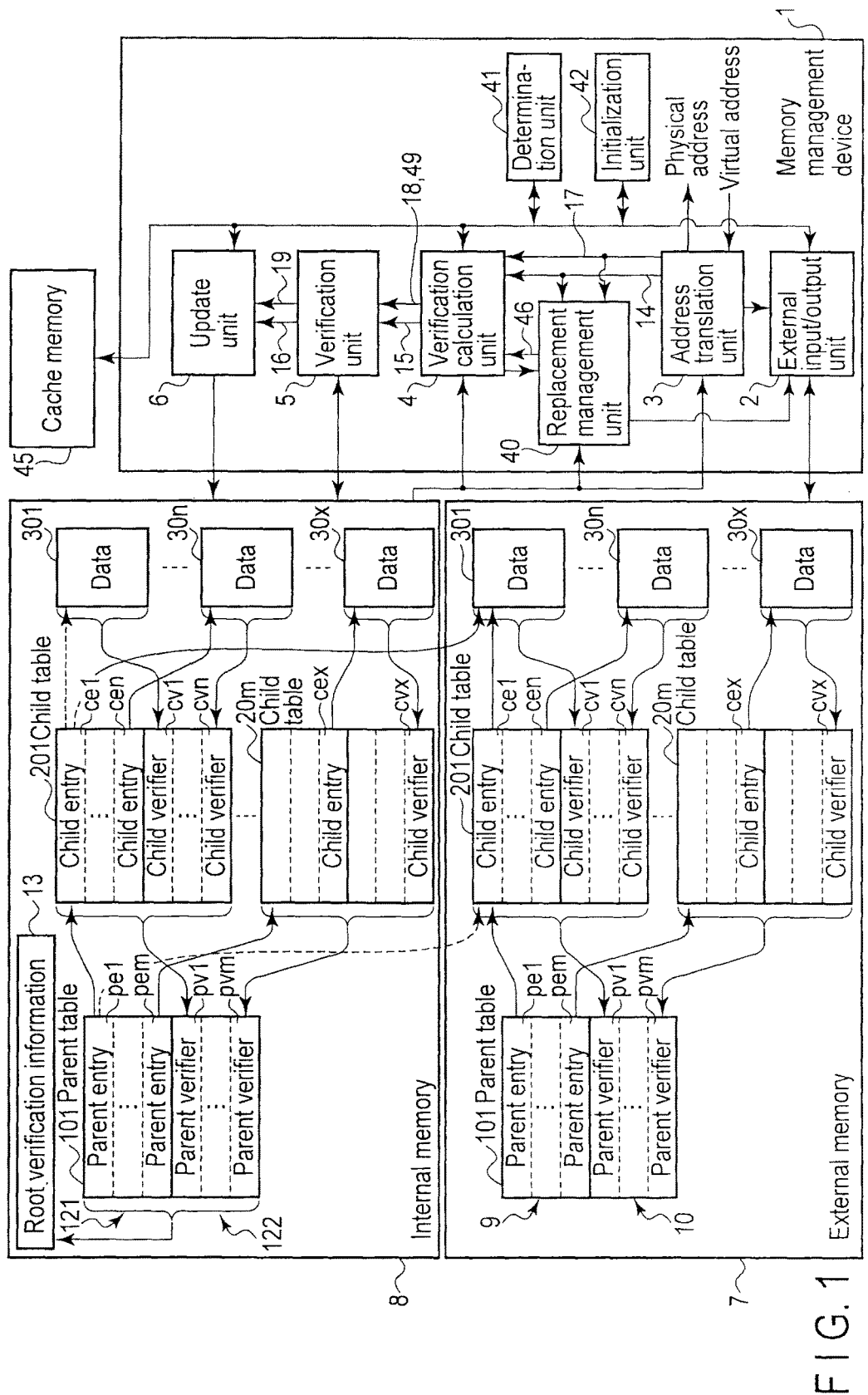
F I G. 1

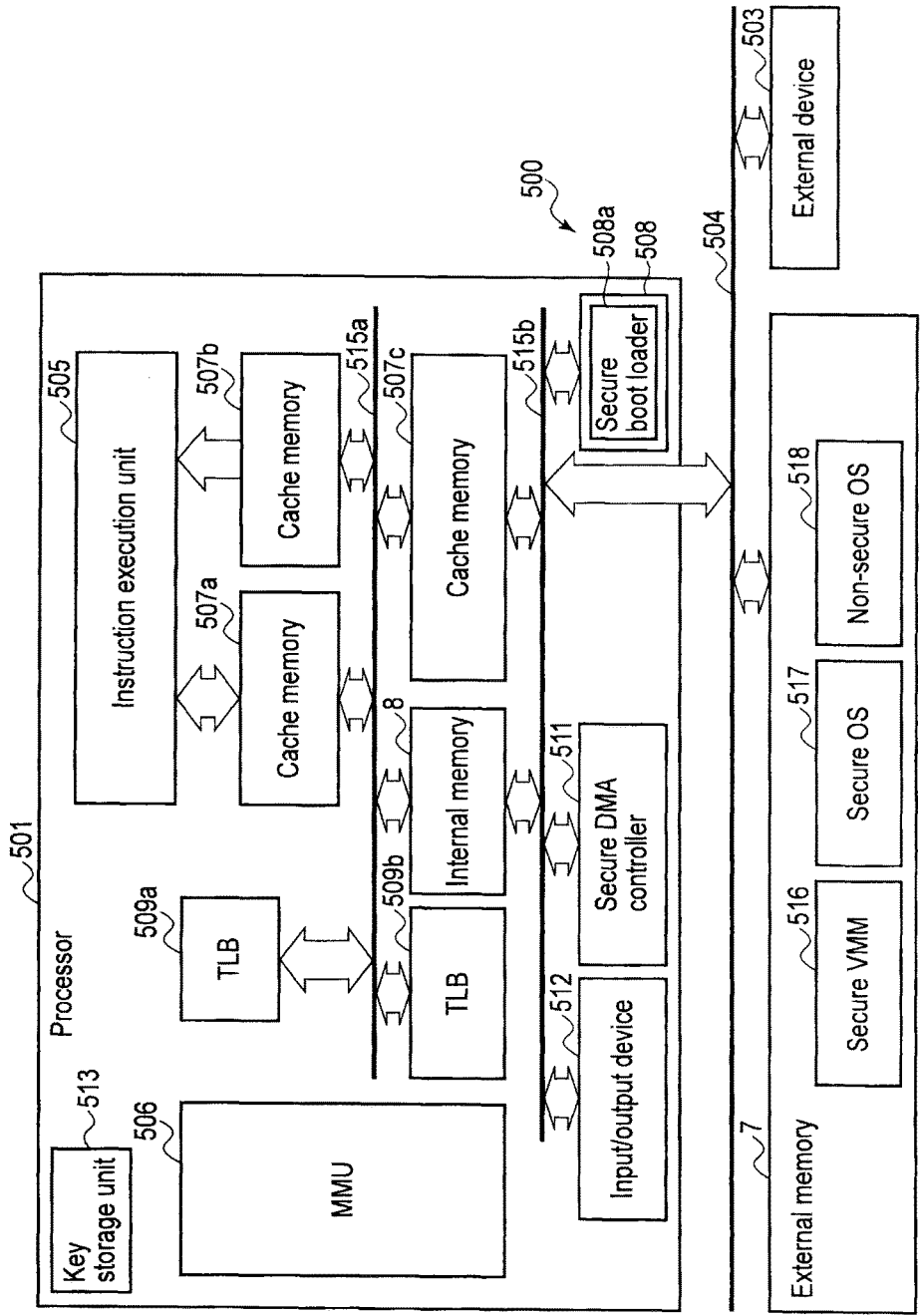
F I G. 2

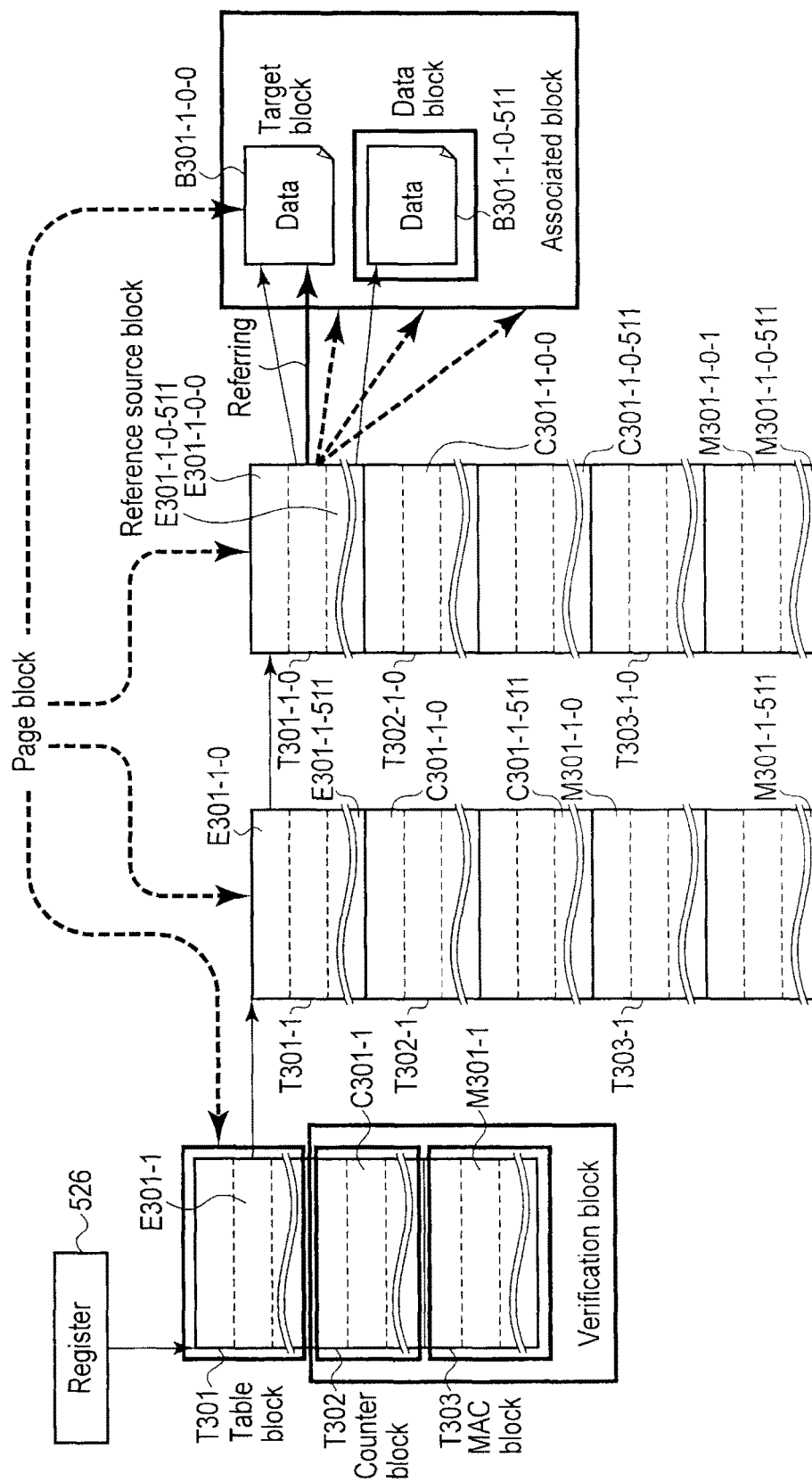
F I G. 5

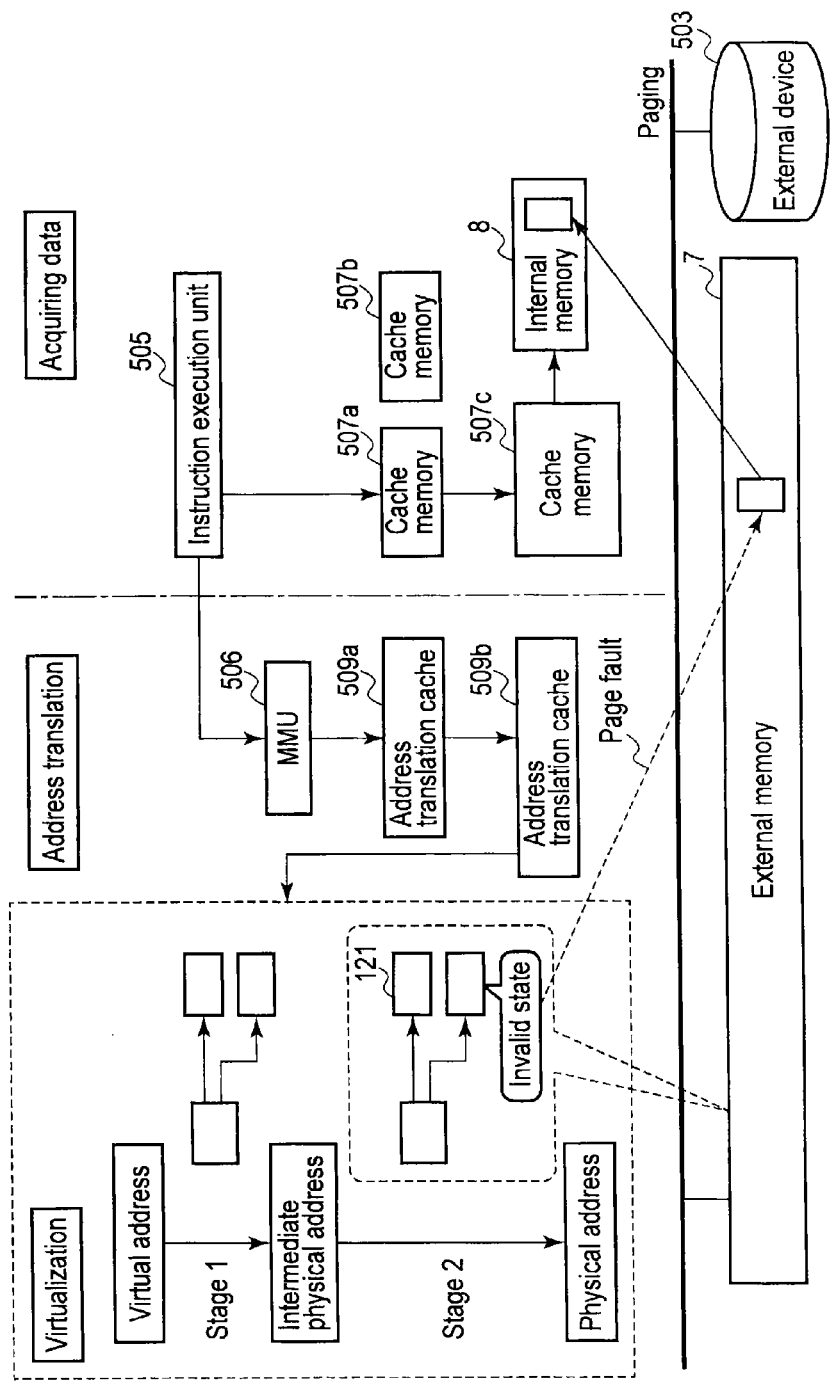
F I G. 6

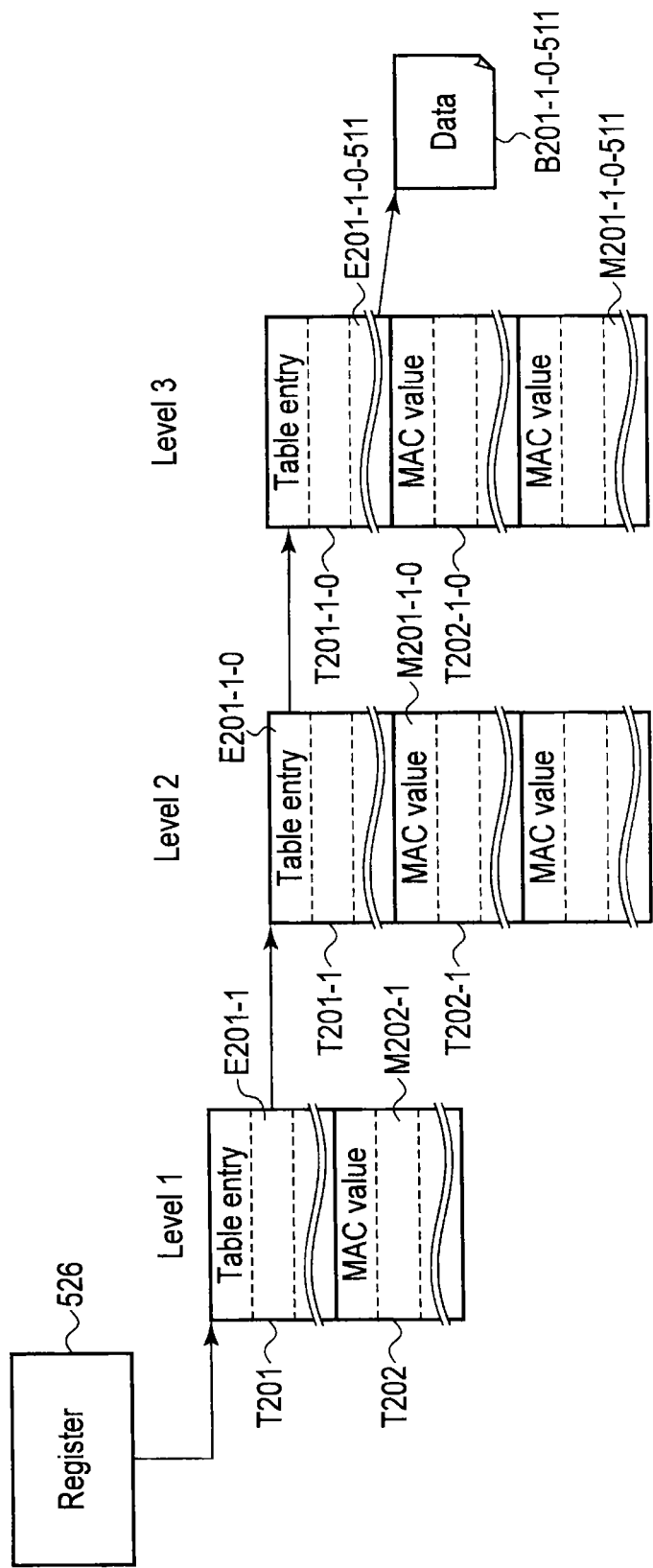
F I G. 8

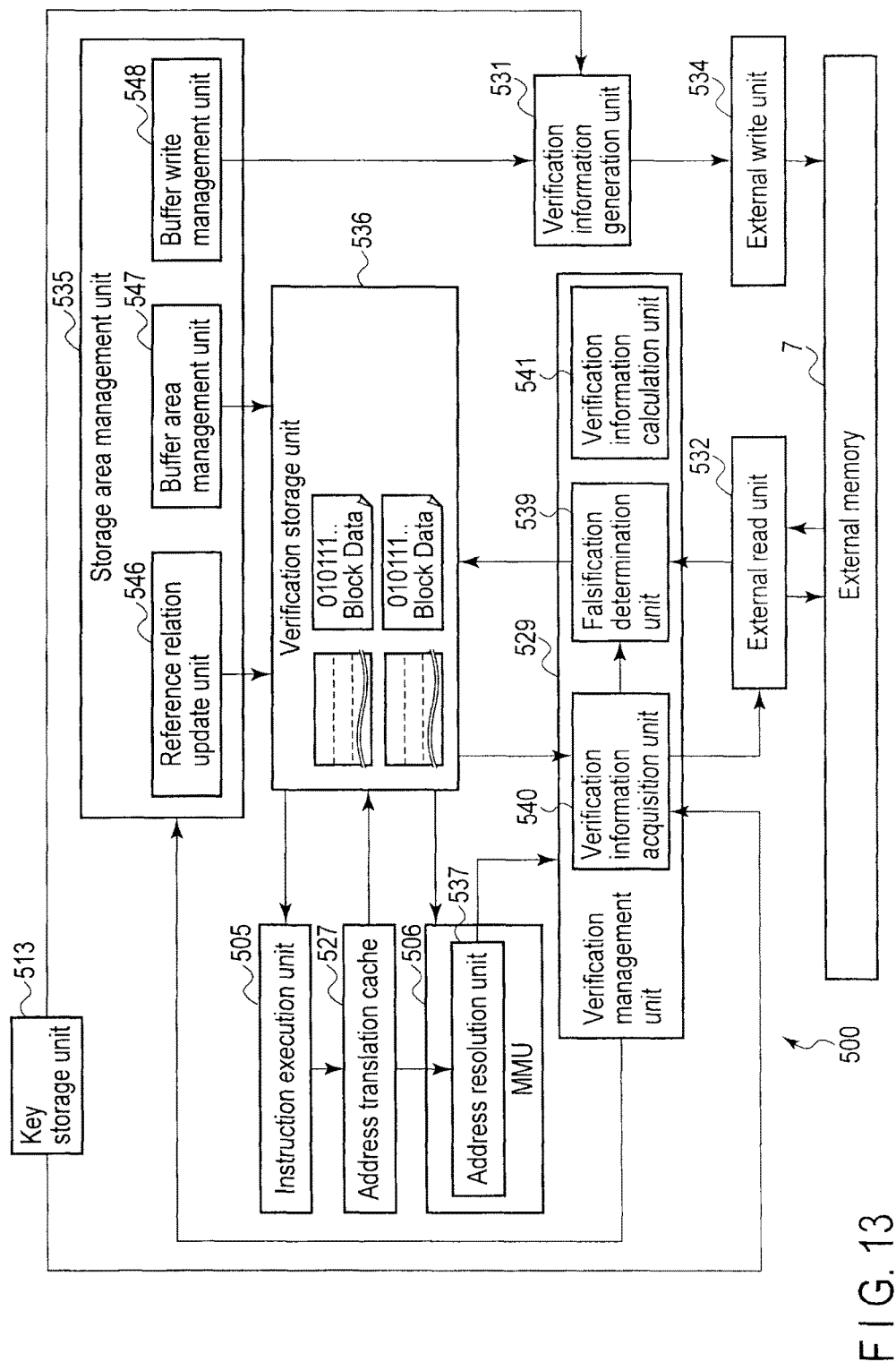
F I G. 13

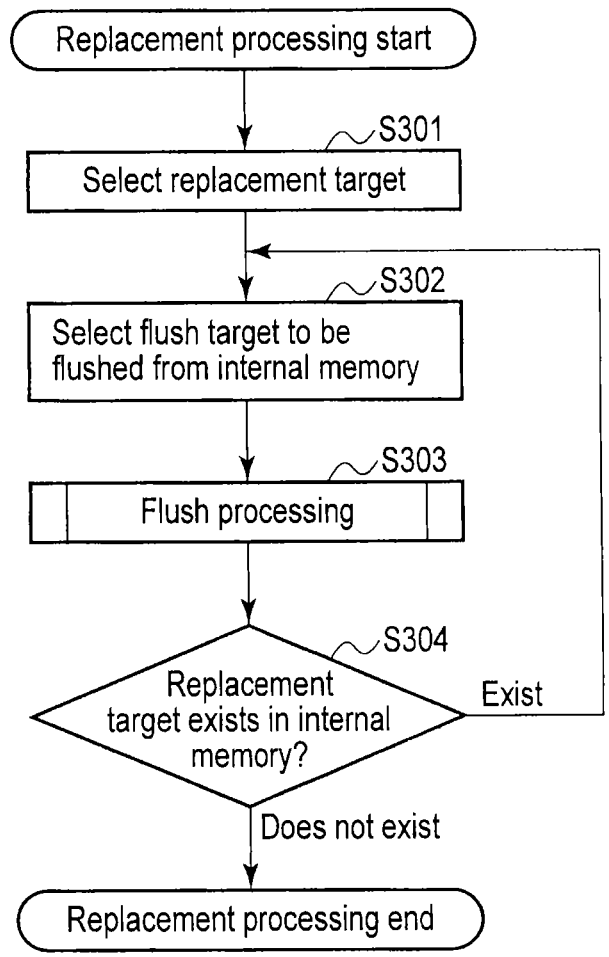
F I G. 15

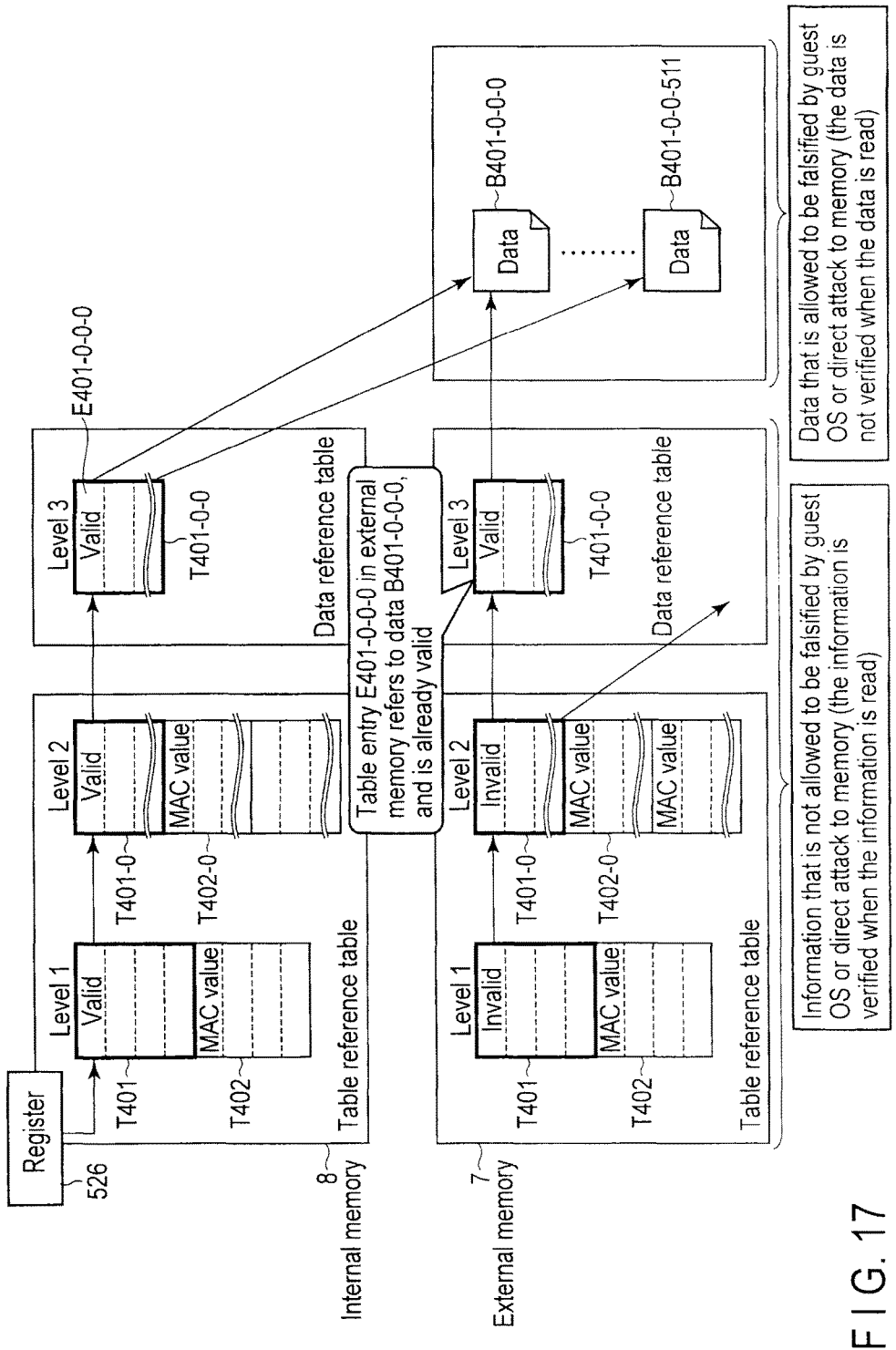
F I G. 17

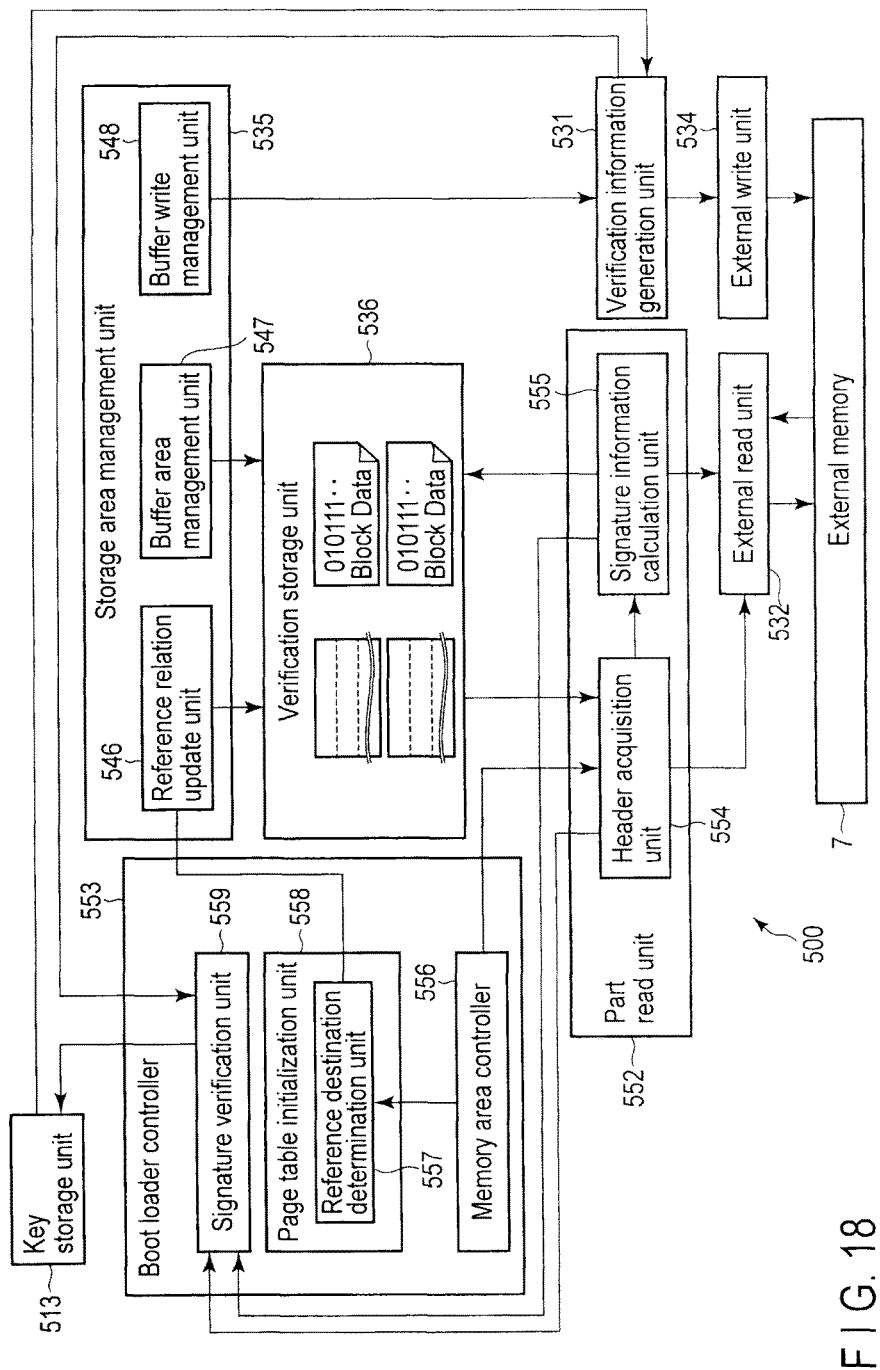
F I G. 18

MEMORY MANAGEMENT DEVICE AND NON-TRANSITORY COMPUTER READABLE STORAGE MEDIUM

CROSS-REFERENCE TO RELATED APPLICATIONS

This application is based upon and claims the benefit of priority from Japanese Patent Application No. 2014-127574, filed Jun. 20, 2014, the entire contents of which are incorporated herein by reference.

FIELD

Embodiments described herein relate generally to a memory management device and a non-transitory computer readable storage medium.

BACKGROUND

A nonvolatile memory contributes to high-speed boot of an information processing device, and low energy consumption by a normally-off function. However, in a term of data security, the nonvolatile memory may be attacked in a manner different from an attack on volatile memory.

For instance, when power to currently working information processing device is interrupted, data in the volatile memory of the device will disappear. Therefore, even if the volatile memory is physically accessed after the power down, data stored in the volatile memory before the power down cannot be thieved or falsified.

In contrast, a nonvolatile memory still store data even during power down. Accordingly, it is possible to remove the nonvolatile memory from an information processing device during the power down, thieve and falsify data therein using an external device, then return the nonvolatile memory to the information processing device, and restart the information processing device. As a result, an operation of the information processing device can be illegally changed. Such a memory attack will especially be significant threat to an information processing device used outside or at a location where a person can illegally access it.

As a countermeasure against illegal data falsifying, various verification techniques, such as hashing or Message Authentication Code (MAC), are used. In general, a hash value and a MAC value for verification target data are called verifiers. In data falsifying verification, it is determined whether verification target data is falsified according to whether a first verifier calculated at a first time based on the verification target data matches a second verifier calculated at a second time based on the verification target data. When a verifier is calculated for verification target data and verification is executed based on the verifier, the verification target data itself may be stored in a place where it may be falsified. However, it is necessary to store the verifier and a secret key in a secure place where neither of falsifying and reference is possible.

BRIEF DESCRIPTION OF THE DRAWING

FIG. 1 is a block diagram showing an example of a structure of a memory management device according to a first embodiment.

FIG. 2 is a block diagram showing an example of a hardware configuration of the information processing device according to a second embodiment.

FIG. 5 is a conceptual diagram showing an example of definitions of blocks according to the second embodiment.

FIG. 6 is a block diagram showing an example of a concept of a data acquisition and address translation by an information processing device according to the second embodiment.

FIG. 8 is a data structure diagram showing an example of a MAC tree structure of a secure page table tree and secure verifier tree according to the second embodiment.

FIG. 13 is a block diagram showing an example of a first structure of the information processing device according to the second embodiment.

FIG. 15 is a flowchart showing an example of replacement processing according to the second embodiment.

FIG. 17 is a data structure diagram showing an example of a reference state of a table entry included in a data reference table according to the second embodiment.

FIG. 18 is a block diagram showing an example of a second structure of the information processing device according to the second embodiment.

DETAILED DESCRIPTION

Figure 3:
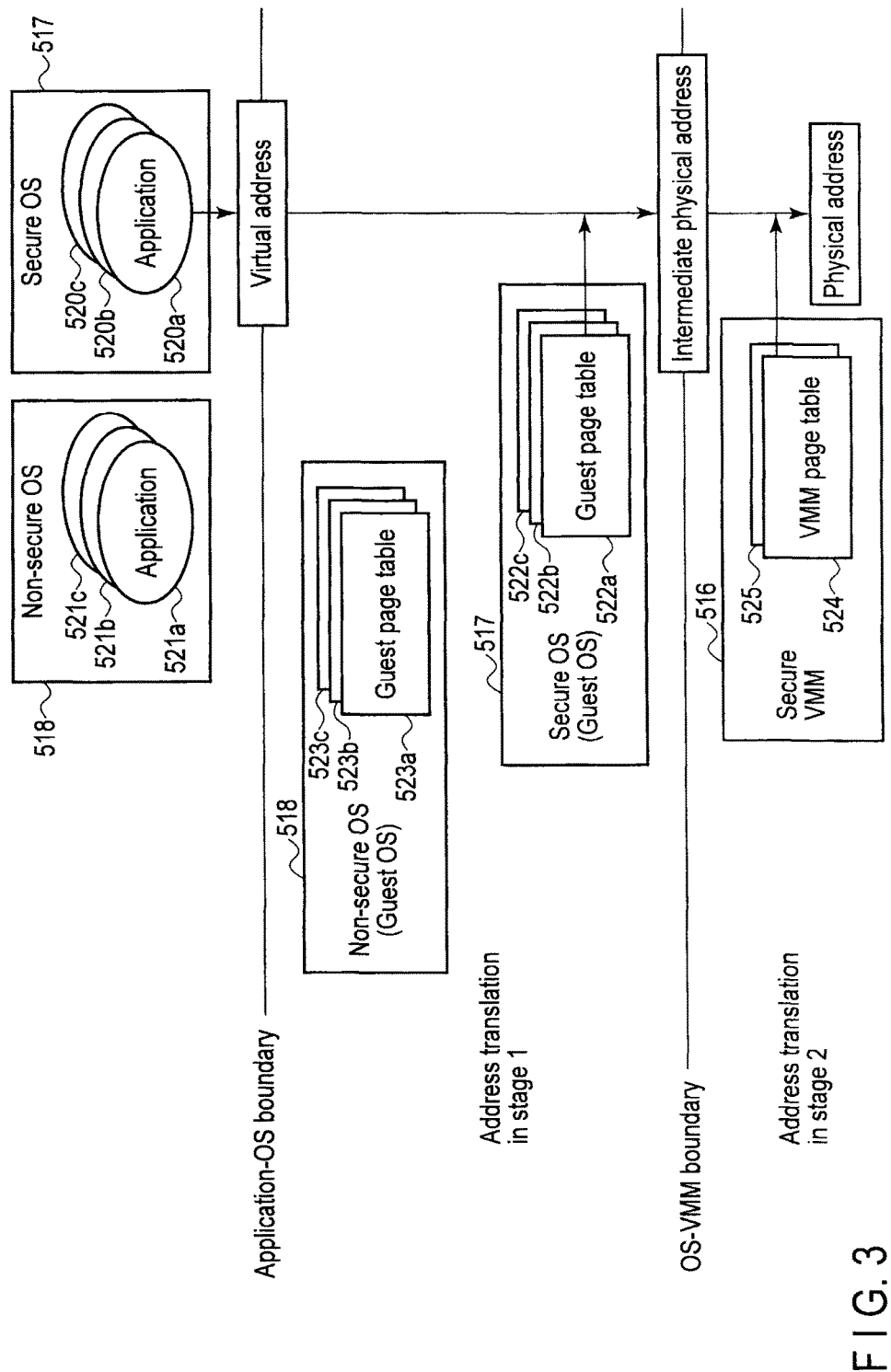
FIG. 3 is a block diagram showing an example of a configuration for executing two-stage address translation.

In general, according to one embodiment, a memory management device includes an external input/output unit, address translation unit, verification calculation unit, verification unit, determination unit, and update unit. The external input/output unit executes reading and writing for a first storage unit. The first storage unit stores a table tree including a parent table and a child table, and a verifier tree including a parent verifier associated with the parent table and a child verifier associated with the child table. The parent verifier is used for verifying the child table and the child verifier. The address translation unit translates a first address into a second address, based on a secure table tree which is a part of the table tree and is stored in a secure second storage unit. The secure second storage unit stores a secure verifier tree which is a part of the verifier tree. The verification calculation unit calculates verification information, when a first child table included in the table tree and needed for translating the first address into the second address is not included in the secure table tree, based on the first child table in the table tree and a first child verifier included in the verifier tree and associated with the first child table. The verification unit executes verification, based on the verification information and a first parent verifier included in the secure verifier tree and associated with a first parent table referring to the first child table. The determination unit determines whether a type of an operating system which requests allocation of a storage area of new data requires secure. The update unit incorporates the first child table and the first child verifier into the secure table tree and the secure verifier tree, respectively, when a result of the verification designates validity. The update unit, when it is determined which the operating system does not require security, sets the second address in the secure table tree such that the second address designates the new data stored in the first storage unit, and sets a valid state in an entry referring to the new data in the first child table.

Embodiments will be described with reference to the accompanying drawings. In the descriptions below, similar reference numbers denote elements similar in function and structure, and duplicate descriptions will be given only when necessary.

[First Embodiment]

In the present embodiment, management of a page table for address translation is switched between a secure operating system (OS) (protected OS) that is required to be secure and a non-secure OS (non-protected OS) that is not required to be secure. The secure OS is protected by falsification verification. Data of the non-secure OS is not required to be protected by verification. By contrast, the page table for limiting the memory access range of the non-secure OS is protected by verification, to protect the image of the secure OS that coexists on the same system from unauthorized falsification caused by malfunction of the non-secure OS.

FIG. 1 is a block diagram showing an example of a structure of the memory management device according to the present embodiment.

The memory management device 1 includes an external input/output unit 2, an address translation unit 3, a verification calculation unit 4, a verification unit 5, an update unit 6, a replacement management unit 40, a determination unit 41 and an initialization unit 42.

The memory management device 1 executes reading and writing to an external memory 7 as a first storage unit, an internal memory 8 as a second storage unit, a cache memory 45 as a third storage unit.

The external memory 7 is, for example, a nonvolatile memory device. More specifically, the external memory 7 may be a nonvolatile semiconductor memory, such as a NAND flash memory, a NOR flash memory, a magnetoresistive random access memory (MRAM), a phase-change random access memory (PRAM), a resistive random access memory (ReRAM) or a ferroelectric random access memory (FeRAM). The external memory 7 may be used as a main storage device, or as an auxiliary storage device, such as a hard disk, or a solid-state drive (SSD).

The external memory 7 stores a page table tree 9 having a hierarchical structure, and a verifier tree 10 having a hierarchical structure. In the present embodiment, the page table tree 9 and the verifier tree 10 each have a two-stage hierarchy. However, it is a matter of course that the page table tree 9 and the verifier tree 10 may each have a three-stage or more hierarchy.

The page table tree 9 is formed by a hierarchical structure including a plurality of page tables. The page table tree 9 includes a parent table 101 and child tables 201 to 20$m$. When a table entry E includes address information X, and address information X designates an intermediate table T for determining an access destination of target data D, or data D itself, this means that the table entry E refers to the table T or data D. A reference destination address in the table entry E is the address information X. A reference source of the table T or data D is the table entry E. Parent entries pe1 to pem included in the parent table 101 are used for referring to the child tables 201 to 20$m$. Child entries ce1 to cex included in the child tables 201 to 20$m$ are used for referring to data 301 to 30$x$.

In the present embodiment, a description will be given of a typical case where the data 301 is accessed via the parent entry pe1 in the parent table 101 and the child entry ce1 in the child table 201 in the page table tree 9. However, a similar description also applies to a case where data is accessed via another parent table, another parent entry, another child table, or another child entry.

The verifier tree 10 has a hierarchical structure including parent verifiers pv1 to pvm and child verifiers cv1 to cvx. The parent verifiers pv1 to pvm are associated with the parent table 101. The child verifiers cv1 to cvn are associated with the child table 201. A similar description to the relationship between child verifiers cv1 to cvn and the child table 201 also applies to the relationship between other child verifiers and a corresponding child table.

In the present embodiment, the child verifiers cv1 to cvn associated with the child table 201 are used for verifying data 301 to 30$n$ referred to by the child entries ce1 to cen included in the child table 201, respectively.

The parent verifier pv1 associated with the parent table 101 is used for verifying the child table 201 referred to by the parent entry pe1 included in the parent table 101, and the child verifiers cv1 to cvn associated with the child table 201. A similar description to a relationship between the parent verifier pv1 and combination of the child table 201 and child verifiers cv1 to cvn also applies to a relationship between another parent verifier and combination of a corresponding child table and corresponding child verifiers.

The internal memory 8 is a storage device that cannot directly be accessed externally and is protected from illegal access. For example, the internal memory 8 is a storage device in a processor package. For instance, the internal memory 8 is, for example, hardware integrated with the package of a processor 501 as one body, as is shown in FIG. 2 directed to a second embodiment described below. Data transfer is performed between the internal memory 8 and an external bus 504 via internal bus 515$b$. The data transfer is performed based on an instruction executed by an instruction execution unit 505 incorporated in the processor 501. It is supposed that a content of the internal memory 8 cannot directly be read or rewritten via the external bus 504. A memory having a similar feature to that of the internal memory 8 is regarded as secure memory. In contrast, in the external memory 7, reading and writing for an arbitrary address and reading and rewriting data corresponding to the address are possible via the external bus 504. Therefore, the external memory 7 is not regarded as a secure memory.

The internal memory 8 and the external memory 7 are arranged in a same physical address space. The internal memory 8 can be accessed from software executed by the instruction execution unit 505, like the external memory 7.

The internal memory 8 stores a secure page table tree 121 for translation of an first address into a second address as a part of the page table tree 9, and a secure verifier tree 122 as a part of the verifier tree 10. The internal memory 8 stores root verification information 13 used for verifying the parent table 101 and parent verifiers pv1 to pvm.

The address translation unit 3 determines physical addresses of the data 301 to 30x via parent entries pe1 to pem in the parent tale 101 and child entries ce1 to cex in the child tables 201 to 20m, stored in the internal memory 8.

When the parent table 101 is copied (moved or read-in) from the external memory 7 to the internal memory 8, the parent verifiers pv1 to pvm associated with the parent table 101 are also copied from the external memory 7 to the internal memory 8.

In the present embodiment, a page table or data is copied from the external memory 7 to the internal memory 8 that is protected from falsification, and is verified. When a page table or data in the internal memory 8 is changed and then deleted from the internal memory 8, the changed page table or data in the internal memory 8 is written to the external memory 7. When a page table or data in the internal memory 8 is deleted from the internal memory 8 without any change, the page table or data in the internal memory 8 may be written to the external memory 7 or may be directly discarded. In the description below, copy of a page table or data between the external and internal memories 7 and 8 may be expressed as moving, reading-in or writing-out. For instance, change of a reference destination of a page table to the page table or data copied to the internal memory 8 may be expressed as moving or reading of the page table or data. In this case, the page table or data as a copy source in the external memory 7 may not be deleted.

When the child table 201 is copied from the external memory 7 to the internal memory 8, the child verifiers cv1 to cvn associated with the child table 201 are also copied from the external memory 7 to the internal memory 8.

The external input/output unit 2 executes reading and writing for the page table tree 9 and the verifier tree 10 stored in the external memory 7.

The determination unit 41 determines in advance whether the type of the OS is a secure OS or a non-secure OS. For example, the type of the OS is obtained in advance from the image of the OS together with generation of the page table tree 9 and the verifier tree 10, and included in the root verification information 13. For example, the determination unit 41 determines the type of the OS that requests assignment of new data, based on the header or the footer attached to the image of the OS.

When a page table that is necessary for referring to a partial boot image obtained by dividing a boot image of the OS is incorporated into the page table tree 9 in the external memory 7, the initialization unit 42 sets information designating that the initialization state is finished in an entry of the incorporated page table.

Firstly, a description will be given of a case where the child table 201 and child verifiers cv1 to cvn are copied from the external memory 7 to the internal memory 8.

The address translation unit 3 translates a virtual address into a physical address, based on the secure page table tree 121 stored in the internal memory 8. When the child table 201 needed to translate a virtual address into a physical address is not included in the secure page table tree 121, the address translation unit 3 sends a table-missing notification (fault) 14 to the verification calculation unit 4, and translates the virtual address into the physical address, based on the updated secure page table tree 121.

When the verification calculation unit 4 receives the table-missing notification 14 from the address translation unit 3, the verification calculation unit 4 reads, from the external memory 7 via the external input/output unit 2, the child table 201 in the page table tree 9 and child verifiers cv1 to cvn in the verifier tree 10, calculates verification information 15, based on the read child table 201 and child verifiers cv1 to cvn, and sends the verification information 15 to the verification unit 5.

The verification unit 5 executes verification, that is, determines whether the verification information 15 calculated by the verification calculation unit 4 matches the parent verifier pv1 in the secure page table tree 121 associated with the parent table 101 that includes a reference source entry pe1 in the secure page table tree 121. Subsequently, the verification unit 5 sends a verification result 16 to the update unit 6.

When the update unit 6 receives the verifier result 16 from the verification unit 5 and the verifier result 16 designates validity, the update unit 6 sets the child table 201 in the secure page table tree 121 in the internal memory 8 and sets child verifiers cv1 to cvn in the secure verifier tree 122 in the internal memory 8. More specifically, assume here that before updating, the parent entry pe1 in the parent table 107 refers to the child table 201 included in the page table tree 9 in the external memory 7. The update unit 6 updates the parent entry pe1 to be updated in the parent table 101 in the secure page table tree 121 to cause it to refer to the child table 201 included in the secure page table tree 121 in the internal memory 8.

In the memory management device 1 of the present embodiment, for example, the external input/output unit 2 may read, before a confirmation of the verification result 16, the child table 201 and child verifiers cv1 to cvn into the internal memory 8, and set the child table 201 and child verifiers cv1 to cvn in the secure page table tree 121 and the secure verifier tree 122 if the verification result 16 designates validity.

As described above, in the present embodiment, when the child table 201 is not stored in the internal memory 8, and the child table 201 and verifiers cv1 to cvn are copied from the external memory 7 to the internal memory 8, and the child table 201 and verifiers cv1 to cvn are copied from the external memory 7 to the internal memory 8, the parent entry pe1 in the parent table 101 refers to the child table 201 in the external memory 7. When the child table 201 is stored in the internal memory 8, the parent entry pe1 in the parent table 101 is updated to refer to the child table 201 in the internal memory 8.

In the present embodiment, when the parent table 101 is not stored in the internal memory 8, and the child table 201 and verifiers cv1 to cvn are copied from the external memory 7 to the internal memory 8, the verification calculation unit 4 generates verification information, based on the parent table 101 and parent verifiers pv1 to pvn read from the external memory 7, and physical addresses stored in the parent table 101 in the external memory 7. By generating the verification information using the physical addresses of the parent table 101 in the external memory 7, a protection from an attack of exchanging the parent table 101, can be realized. The verification unit 5 executes verification based on the root verification information 13 and the generated verification information. When a verification result designates validity, the update unit 6 sets, in the secure page table tree 121, the parent table 101 read from the external memory 7, and sets, in the secure verifier tree 122, the parent verifiers pv1 to pvn read from the external memory 7.

Secondly, a description will be given of an example case where the data 301 is copied, in the secure-OS, from the external memory 7 to the internal memory 8.

The address translation unit 3 sends a data read notification 17 to the verification calculation unit 4 and the replacement management unit 40 when a physical address obtained by translating a virtual address refers to the external memory 7.

For instance, the address translation unit 3 may manage, in advance, the reference-data read state of the internal memory 8 without determining whether a data reference destination is the external memory 7, using a valid/invalid flag in a page table, thereby increasing a speed of determination of the data reference destination. A valid flag is set in a table entry in the secure page table tree 121 that refers to data stored in the internal memory 8. In the secure-OS, an invalid flag is set in a table entry of the secure page table tree 121 that refers to data stored in the external memory 7. When a page fault associated with address translation is occurred, the address translation unit 3 copies a page table or data in the external memory 7 to the internal memory 8. When reference data is stored in the internal memory 8, the address translation unit 3 can refer to the data at high speed without any page fault.

When the verification calculation unit 4 receives the data read notification 17 from the address translation unit 3, the verification calculation unit 4 reads the data 301, referred to by a physical address, from the external memory 7 via the external input/output unit 2, calculates data verification information 18, based on the read data 301 and the physical address in the external memory 7 corresponding to the data 301, and sends the data verification information 18 to the verification unit 5. By thus generating the data verification information 18 using a physical address of data in the external memory 7, a protection from an attack of exchanging the data 301, can be realized.

The verification unit 5 executes data verification as to whether the data verification information 18 calculated by the verification calculation unit 4 matches the child verifier cv1 associated with the child table 201 as a reference source in the secure page table tree 121, and sends a data verification result 19 to the update unit 6.

The update unit 6 receives the data verification result 19 from the verification unit 5, and sets data 301 in the secure page table tree 121 in the internal memory 8 when the data verification result 19 designates validity. More specifically, assume here that before updating, the child entry ce1 in the child table 201 refers to data 301 included in the page table tree 9 in the external memory 7. The update unit 6 updates the child entry ce1 to be updated in the child table 201 in the secure page table tree 121 to cause it to refer to data 301 in the internal memory 8.

In the memory management device 1 according to the present embodiment, for example, the external input/output unit 2 may read, before a confirmation of the data verification result 19, data 301 into the internal memory 8, and set the data 301 in the secure page table tree 121 when the data verification result 19 designates validity.

As described above, when in the present embodiment, data 301 is not stored in the internal memory 8, and is copied from the external memory 7 to the internal memory 8, the child entry ce1 in the child table 201 refers to data 301 in the external memory 7. When the data 301 is stored in the internal memory 8, the child entry ce1 in the child table 201 is updated to refer to data 301 in the internal memory 8.

A virtual address is translated to a physical address corresponding to the data 301 via the parent entry pe1 in the parent table 101 and child entry ce1 in the child table 201. The data 301 to be referred to is stored in an area in the secure internal memory 8 designated by the physical address. All data and tables to be referred to by such address resolution are determined valid by the verification, and are arranged in the secure internal memory 8.

Thirdly, a description will be given of a case where data 301 is copied (written) from the internal memory 8 in the secure-OS to the external memory 7.

The verification calculation unit 4 calculates the child verifier (data verification information) cv1, based on the data 301 in the internal memory 8, when an OS that requests address translation is the secure-OS, and the data 301 stored in the internal memory 8 is written to the external memory 7.

The external input/output unit 2 stores the data 301 in the external memory 7.

The update unit 6 updates, to a storage position of the data 301 in the external memory 7, a reference destination (physical address) of the child entry ce1 in the child table 201 in the secure page table tree 121. Further, the update unit 6 associates the child verifier cv1 calculated by the verification calculation unit 4 with the child table 201 in the secure page table tree 121, and sets the child verifier cv1 to the secure page table tree 121. Then, when the data 301 is referred to, a page fault occurs, whereby the data 301 in the external memory 7 is verified and copied to the internal memory 8 as described above.

In the present embodiment, the update unit 6 sets the parent entry pe1 in the parent table 101 invalid when the secure page table tree 121 does not include the child table 201, and sets the parent entry pe1 in the parent table 101 valid when the child table 201 is incorporated in the secure page table tree 121.

The update unit 6 sets the child entry ce1 in the child table 201 invalid when the internal memory 8 does not store the data 301, and sets the child entry ce1 in the child table 201 valid when the internal memory 8 stores the data 301.

In the above-described first and second cases, the replacement management unit 40 confirms a capacity of a free area in the internal memory 8, when a table or data is to be stored in the internal memory 8, for example, when the data read notification 17 is received from the address translation unit 3. When the capacity of the free area in the internal memory 8 is not enough, the replacement management unit 40 sends, to the verification calculation unit 4, a verification information request 46 for a table or data in the internal memory 8 selected to be deleted. In a response to the verification information request 46, the replacement management unit 40 receives, from the verification calculation unit 4, a verifier corresponding to the selected table or data in the internal memory 8. Then, the replacement management unit 40 writes the selected table or data in the internal memory 8 and its verifier to the external memory 7 via the external input/output unit 2, thereby releasing an area of the selected table or data in the internal memory 8 to increase the free area in the internal memory 8.

Fourthly, the following example will be explained hereinafter, in which in a non-secure OS the memory management device 1 reads the data 301 stored in the external memory 7.

In the secure page table tree 121 in the non-secure OS, a valid state is set in a table entry that refers to the data 301 stored in the external memory 7.

The address translation unit 3 translates a virtual address into a physical address in the external memory 7, based on the secure page table tree 121 in the non-secure OS.

The external input/output unit 2 reads the data 301 to be referred to from the external memory 7, based on the translated physical address, and stores the data 301 in, for example, the cache memory 45.

Fifthly, the following example is explained hereinafter, in which the memory management device 1 stores the child table 201 that refers to the data 301 in the external memory 7, into the external memory 7, in the non-secure OS.

The update unit 6 incorporates the child table 201 into the page table tree 9 in the external memory 7 via the external input/output unit 2, in the secure page table tree 121 in the non-secure OS. The physical address of the data 301 in the external memory 7 and the valid state thereof are set in the child entry ce1 in the child table 201 to be incorporated.

The update unit 6 sets an invalid state in the higher parent entry pe1 that refers to the child table 201 in the secure page table tree 121.

Sixthly, the following example is explained hereinafter, in which the memory management device 1 reads the child table 201 stored in the external memory 7, in the non-secure OS.

The memory management device 1 reads the child table 201 stored in the external memory 7 by processing similar to that of the above first example, executes verification processing based on the secure verifier tree 122, and incorporates the child table 201 into the secure page table tree 121 in the internal memory 8. A valid state and the physical address of the data 301 in the external memory 7 are set in the child entry ce1 in the child table 201 incorporated into the secure page table tree 121.

The update unit 6 sets a valid state in the higher parent entry pe1 that refers to the child table 201 in the secure page table tree 121.

Seventhly, an example of boot processing of the OS will be explained hereinafter.

In the present embodiment, the boot image of the OS is read into the memory management device 1 for each of partial boot images that are obtained by dividing the boot image.

Suppose that the boot image header attached to the boot image of the OS includes signature information of the boot image.

The external input/output unit 2 successively obtains selected partial boot images (for example, data 301 to 30x) from the external memory 7, in the boot processing of the OS.

The verification calculation unit 4 successively receives the selected partial boot images 301 to 30x from the external input/output unit 2. The verification calculation unit 4 successively generates verifiers of the selected partial boot images 301 to 30x, and a verifier for verification of the page table necessary for referring to the selected partial boot images 301 to 30x. The verification calculation unit 4 also successively generates signature information of the partial boot images 301 to 30x.

The update unit 6 successively stores the verifiers of the partial boot images 301 to 30x and the verifier of the page table into the internal memory 8.

The update unit 6 incorporates the verifiers of the selected partial boot images 301 to 30x in the internal memory 8, the page table necessary for referring to the selected partial boot images 301 to 30x, and the verifier for verification of the page table into the page table tree 9 and the verifier tree 10 in the external memory 7, via the external input/output unit 2.

When the page table necessary for referring to the selected partial boot images 301 to 30x is incorporated into the page table tree 9 in the external memory 7, the initialization unit 42 sets information designating that the initialization state is finished, in an entry of the incorporated page table.

The verification unit 5 performs verification based on the signature information of the boot image and the successively generated signature information of the selected partial boot images 301 to 30x. When the verification succeeds, the verification unit 5 validates the OS, and sets root verification information 13. When the verification ends in failure, the verification unit 5 discards the page table tree 9 and the verifier tree 10, and invalidates the OS.

The effect of the present embodiment will be explained hereinafter.

In the present embodiment, data of the non-secure OS is used in a state of being kept stored in the external memory 7, without being read into the internal memory 8. In the present embodiment, verification of data of the non-secure OS can be omitted, and the throughput is improved. In the present embodiment, it is possible to prevent the damage spreading to another secure OS and other software, even if the non-secure OS is taken over by an attacker.

The present embodiment enables load of a boot image having a size larger than the internal memory 8, generation of the page table tree 9 and the verifier tree 10, thereby booting up the OS.

The present embodiment enables verification for a boot image based on signature information of the boot image.

The present embodiment enables recognition that initialization has been finished for a usable part in the page table tree 9 and the verifier tree 10. The present embodiment enables booting up of the OS using the part that has been initialized, even during boot processing, and enables speeding up the boot processing.

In the present embodiment, any necessary portion of the page table tree 9, verifier tree 10 and data 301 to 30x stored in the external memory 7 can be selectively verified, and the verified necessary portion can be stored in the internal memory 8 smaller in capacity than the external memory 7. As a result, a physical attack against the external memory 7 can be detected, and data integrity can be verified to thereby prevent falsification of data. In the present embodiment, falsification of the page table tree 9, the verifier tree 10 and data 301 to 30x can be detected by falsification verification, thereby enhancing a security level of the information processing device.

Verification according to the present embodiment is applicable to a virtualization technique, and can be easily applied without changing a guest operating system (OS) and application by referring to the secure page table tree 121 and the secure verifier tree 122 stored in the internal memory 8.

In the present embodiment, the page tables coincide with the verifiers in hierarchical structure, and the page tables and verifiers are verified as one body. In other words, the page table tree 9 and the verifier tree 10 have the same graph structure. As a result, even if a verifier is a paging target, it is not necessary to resolve a destination address of the verifier. Further, since the page tables and the verifiers are managed using a hierarchical structure, the secure page table tree 121, the secure verifier tree 122, the page table tree 9 and the verifier tree 10 can be allocated in memory areas of a discontinuous address space. This enables efficient memory use. In the present embodiment, management of verifiers using a hierarchical structure enables efficient management.

In the present embodiment, whether a page table and data are stored in the internal memory 8 is managed depending upon whether an entry in the upper-level page table corresponding to the page table and data is valid. As a result, it can be determined efficiently whether the page table and data are stored in the internal memory 8, using an address translation mechanism as general-purpose hardware.

In the present embodiment, whether a page table and data are stored in the internal memory 8 is managed depending upon whether an entry of the upper-level page table corresponding to the page table and data is valid. As a result, it can be determined efficiently whether the page table and data are stored in the internal memory 8, using the address translation mechanism as general-purpose hardware.

Various constituent elements of the memory management device 1 according to the present embodiment may be achieved by hardware, or a processor controlled by a memory management program. The processor is controlled by the memory management program, to carry out a memory management method similar to the above memory management device 1.

[Second Embodiment]

In a present embodiment, an information processing device including the memory management device 1 according to the first embodiment will be described in detail.

FIG. 2 is a block diagram showing an example of a hardware structure of the information processing device according to the present embodiment.

The information processing device 500 includes a processor 501, an external memory 7, an external device 503 and an external bus 504. The processor 501, the external memory 7 and the external device 503 can transmit and receive data, signal or instruction therebetween via the external bus 504.

A virtualization assisting mechanism included in the information processing device 500 executes address translation in two stages, for example.

The processor 501 includes an instruction execution unit (processor core) 505, a memory management unit (MMU) 506, cache memories 507*a* to 507*c*, a mask read-only memory (ROM) 508 that stores a secure boot loader 508*a*, address translation caches (Translation Look-aside Buffer: TLB) 509*a* and 509*b*, the internal memory 8, a secure direct memory access (DMA) controller 511, an input/output device 512, a key storage unit 513, and internal buses 515*a* and 515*b*. The structural elements of the processor 501 can transmit and receive data, signal or instruction therebetween via the internal buses 515*a* and 515*b*.

The external memory 7 stores a secure Virtual Machine Monitor (VMM) 516, a secure OS 517 and a non-secure OS 518.

In the present embodiment, the secure OS 517 and the non-secure OS 518 are guest OSs managed by the secure VMM 516.

The external device 503 is a nonvolatile memory device, such as a hard disk.

The instruction execution unit 505 of the processor 501 executes data reference, using cache memories 507*a* to 507*c* that have hierarchical structures. In a following explanation, data reference executed after address translation will be described firstly, and then the address translation will be described.

The cache memory 507*a* is a primary cache memory for data. The cache memory 507*b* is a primary cache memory for data and instruction. The cache memory 507*c* is a secondary cache memory for data and instruction.

The instruction execution unit 505 can refer to the data or instruction stored in the cache memory 507*c* more quickly than to those stored in the internal memory 8 or external memory 7. Further, the instruction execution unit 505 can access cache memories 507*a* and 507*b* quicker than the cache memory 507*c*.

The instruction execution unit 505 reads data or instruction from the cache memory 507*a*, 507*b* and/or 507*c*, or the internal memory 8, and executes processing.

When reference target data is stored in cache memory 507*a* or 507*b*, data reference to the cache memory 507*c* or the internal memory 8 is not performed.

When reference target data is not stored in cache memory 507*a* or 507*b*, and is stored in the cache memory 507*c*, data reference to the internal memory 8 is not performed. This enables data reference to be performed in a short time.

The data read from the internal memory 8 may be stored to cache memory 507*a* or 507*b* not through the cache memory 507*c*.

The key storage unit 513 stores the root verification information 13, and key information used for an encryption or verification in the information processing device 500.

The secure DMA controller 511 executes data transfer between various structural elements. The secure DMA controller 511 may be realized by, for example, hardware and execute MAC-value calculation. However, the MAC-value calculation may be carried out by software.

The information processing device 500 executes virtual storage management in cooperation with memory verification processing. In the present embodiment, a nonvolatile semiconductor memory is used as a main storage device. In the present embodiment, the page table tree 9 having a hierarchical structure and the verifier tree 10 having a hierarchical structure are generated. The page table tree 9 and the verifier tree 10 match each other in the hierarchical structure. The page table tree 9 and the verifier tree 10 are stored in the nonvolatile external memory 7, and portions of the trees are stored in the internal memory 8 when necessary. Since the external memory 7 is a nonvolatile storage device, the external memory 7 maintains a storage state before power is turned off, when the power is turned off and then again turned on.

For instance, in integrated hardware realized by integrating a package of a processor, such as a central processing unit (CPU) or a micro-processing unit (MPU), and a main storage device, it is difficult to perform the above-mentioned data theft, falsification, and physical attack. However, the integrated hardware is generally expensive, and hence there is a demand for a technique of realizing secure processing by combination of a general-purpose processor package and a general-purpose memory.

In the present embodiment, it is supposed that the internal memory 8 provided within a package of the processor 501 is protected from a physical attack. However, it is also supposed that an attack of causing data to be illegally output from the internal memory 8, using illegal software, is possible. It is further supposed that an attacker against the information processing device 500 can freely renew an arbitrary area at an arbitrary time in the external memory 7.

In the present embodiment, a memory area protected from data falsification, and an encrypted memory area, are referred to as protected memory areas.

In order to prevent an attack against the main storage device of the information processing device 500 and eliminate a threat, the following first to fifth conditions must be satisfied in view of security and system configuration:

The first condition relates to a security. As the first condition, data falsification including a replay attack must be perfectly detectable.

The second condition relates to hardware configuration. As the second condition, dedicated hardware does not have to be required. More specifically, as the second condition, it is required that hardware dedicated to verification of memory falsification is not needed. The second condition requires that an attack is prevented and a threat is eliminated, based on an address translation mechanism, a virtualization assisting mechanism, a general-purpose internal memory in a processor, a speed-up auxiliary mechanism, and/or, a high-speed encryption engine that cooperates with a DMA controller, included in a large number of processors. The second condition requires that processing based on software, such as firmware, is possible. The second condition requires that the hardware configuration is easily compatible with a virtualization technique. The second condition requires that the hardware configuration is operable even if a memory size of the secure internal memory 8 is small such as approximately one megabyte.

The third condition relates to a memory. The third condition requires that a large-capacity memory, such as a memory having a 32-bit address space or more, is usable. The third condition requires that a memory verification target area is selectable. The third condition requires that memory areas as protection targets can be arranged in some discontinuous areas in a memory map, and that only a necessary portion of the memory can be set as a falsification verification target. The third condition requires that data itself, which defines an area of the memory selected as the falsification verification target, can also be protected from an attack. The third condition requires that even when memory areas as protection targets are discontinuous, only selected area can be verified, and a memory area dedicated to a verifier is not required in an area other than those selected, thereby enabling the memory to be used efficiently.

The fourth condition relates to a software configuration and security. The fourth condition requires that the entire OS can be set as a protection target. The fourth condition requires that hardware, which is dedicated to communication with an external device and does not need falsification verification, can be excluded from a falsification verification target and can be set as a non-selected area. The fourth condition requires that the software configuration has transparency, namely, the OS and application do not have to be modified. The fourth condition requires that if an OS is malfunctioned and an illegal instruction is executed, a memory falsification verification function is security and sturdy against a verification detour or damage of control information although the damage of the OS itself and an erroneous operation of the OS are permitted.

The fifth condition relates to efficiency of processing. The fifth condition requires that efficiency of processing should be increased by executing frequently occurring processing, such as determination as to whether falsification verification should be executed for each memory access, using hardware as far as possible.

The present embodiment realizes an information processing device 500, in which a nonvolatile main storage device is supposed to be used, verification is executed based on the secure verifier tree 122, multi-stage address translation is executed based on the secure page table tree 121, a virtualization technique is supposed to be employed, and the above-mentioned first to fifth conditions are satisfied.

The present embodiment has four important points. The first important point will firstly be described.

The first point relates to securing of address transparency, and provision of a detection function of non-verified data reference. More specifically, when reference to data by a guest OS is occurred, the secure VMM 516 confirms a page table entry, and stores data in the external memory 7 to a buffer memory dynamically allocated in the internal memory 8 when verification via the internal memory 8 is needed.

When the verification via the internal memory 8 is succeeded, the secure VMM 516 rewrites a managed secure page table tree 121 (for example, state-2 page table tree shown in FIG. 3 described below) so that data in a physical memory as a data reference destination of the guest OS is changed from original data in the external memory 7 to data of a destination address in the internal memory.

The guest OS does not have to recognize change of the reference destination. Accordingly, even when the verification according to the present embodiment is introduced, the guest OS does not have to be changed, and hence the transparency of the guest OS can be obtained.

The unit of writing in the internal memory 8 is a page. However, in order to reduce the unit of writing to enhance memory-use efficiency of entire processor 501 including cache memories, when the instruction execution unit 505 acquires data from the external memory 7 via cache memory 507*a*, 507*b* or 507*c*, verification may be executed without changing the reference destination of a page table entry, upon copying data from the external memory 7 to cache memory 507*a*, 507*b* or 507*c*. In this case, a hardware mechanism for causing reading from the cache memory and verification processing to cooperate with each other is needed.

To prevent falsification, detection of reference to the external memory 7, execution of verification, copying of verified data to the secure internal memory 8, and change of a reference destination are needed. When a hardware cache is used, change of a reference destination corresponding to the reading to the cache memory 507*c* is executed by a dedicated hardware mechanism without any software, which guarantees address transparency to the guest OS. In contrast, in verification using firmware, an allocated destination of verified data differs from an address of original data. Since thus, the guest OS must be changed unless change of a reference destination is hidden from the guest OS in some way. Namely, address transparency to the guest OS is not guaranteed.

In order to protect verified data from an attack, such as falsification, and to hide copying of the data to the internal memory 8 from the guest OS, the present embodiment uses a virtualization assisting mechanism in which two-stage address translation is performed, whereby the address transparency to the secure OS 517 is realized by changing a data reference destination in the secure page table tree 121 after writing data from the external memory 7 to the internal memory 8.

In the present embodiment, reference to non-verified data in the secure OS 517 is detected. Then, in the secure OS 517 according to the present embodiment, an entry in the secure page table tree 121 is set "invalid" in an initial state, and the entry in the secure page table tree 121 is set "valid" when verification and reading-in of a page table or data corresponding to the entry is succeeded. This enables a non-read page table or non-read data to be efficiently detected in the secure OS 517 using the address translation mechanism realized as general-purpose hardware.

The second point of the present embodiment will then be described.

The second point relates to a technique of matching the hierarchical structure of the secure page table tree 121 with that of the secure verifier tree 122. In the present embodiment, to enable verification of large-scale data, a state of writing from the external memory 7 to the internal memory 8 is managed. In the present embodiment, to realize transparent falsification verification by firmware processing, the address translation mechanism is used. When an operation of the address translation mechanism is interrupted, and such an illegal operation as in which the external memory 7 is erroneously accessed instead of access to the internal memory 8 is performed, the above-described verification and protection of reading data cannot correctly be executed. In view of this, in the present embodiment, the operation of the address translation mechanism is protected from an attack.

The address translation mechanism executes referring to a page table, and address translation. The page table is provided in the internal memory 8, and is definition information for translating a virtual address into a physical address. When the address space is enlarged, a large memory size is needed for storing a page table. For instance, when entire address space of one page table is simply stored, a memory size of 2 gigabytes is needed, assuming that a memory of one terabytes should be protected. Then, simply securing the address space of each page table in a physical memory in a fixed manner imposes a heavy load on the information processing device. There are two methods for reducing the address space of a page table. In a first method, page tables are hierarchized, the resultant hierarchical page tables in the internal memory 8 are referred to, and each page table itself is set as a paging target. A second method relates to hierarchization in the first method. In the second method, a table definition state of a portion in the memory space in the internal memory 8, to which no reference is needed, is maintained undefined, and a discontinuous memory space definition is permitted to thereby reduce the data amount of a table.

The address translation mechanism is a general-purpose mechanism employed in many processors. However, unlimited permission of paging or undefined state of a page table may induce attacks, such as replacement of a legitimate page table or data with an illegitimate page table or data during paging, or re-initialization after rewriting a defined page table or data to an undefined one. In particular, in a non-volatile memory system, data of all memories other than the internal memory 8 may be falsified. Therefore, all page tables or data to be referred to by an MMU need to be arranged in the internal memory 8 after they are verified. As mentioned above, the data size of the page table is large. The internal memory 8 of the processor requires, for example, several hundreds kilobytes to several tens megabytes. Accordingly, paging processing including verification of page tables is needed. When page tables are hierarchized, state management associated with determination to determine up to a page table of which level, verification and reading-in is completed, and state management associated with the frequency of reference to each page table, are needed.

Further, for verification processing of each page table or data, the internal memory 8 of a limited capacitance must be used as a work area. It is possible to use, as a simple verification method, a method of providing a verifier dedicated to a page table, aside from a verifier for data. However, the hierarchical page tables are defined based on a reference relationship on the memory, and are not always allocated in a continuous address area. For instance, in view of a specification, it is possible that a first entry of a page table is located in a position with a lowest address number in an address space, a second entry is located in a position with a highest address number, and the first and second entries have a reference relationship. It is inefficient to apply, to a discontinuous page table, verifiers stored in a continuous address area. In addition, when the verifiers have a hierarchical structure like the page tables, it is necessary to detect up to what stage of the verifiers verification is completed, and to perform state management for reusing the verified ones of the verifiers.

In view of the above, in the present embodiment, the hierarchical structure of the page tables are made to match the hierarchical structure of the verifiers as the second point. By matching the hierarchical structure of the page tables with that of the verifiers as the second point, a page table and a verifier corresponding thereto are protected by another verifier. In the present embodiment, since the page tables match in hierarchical structure with the verifiers, a read-in state and a verification state of the page tables and the verifiers are managed in common, thereby reducing a processing load required for data management of a hierarchical structure. The information processing device 500 efficiently allocates verifiers to widely and discontinuously defined address areas, and manages them in security.

For instance, the three-stage secure page table tree 121, which stores 512 entries in one page table, has a three-stage graph structure having 512 branches. The secure verifier tree 122 corresponding to the secure page table tree 121 is made to have the same graph structure as the secure page table tree 121, i.e., has a three-stage graph structure having 512 branches, thereby matching both the table trees in structure. As a result, the secure page table tree 121 and the secure verifier tree 122 match each other in the unit of management for a reading-in state and a verification state.

In processing of a VMM, if reference, by the external memory 7, to not-read page table or data in the internal memory 8, and reference, by the external memory 7, to not-read verifier in the internal memory 8, are detected separately, switching from a guest OS to the VMM is performed whenever reference to a page table or data and reference to a verifier occur, which increases a switching overhead. In the present embodiment, the page table and the verifier are matched in hierarchical structure, whereby references to two types of control data, i.e., a non-read page table and a non-read verifier, is simultaneously detected. This control reduces the number of times of switching from a guest OS to the secure VMM 68, and hence reduces the processing load.

Next, the third point of the present embodiment will be explained hereinafter.

In many devices, it is unnecessary to verify integrity for all the processes. There are cases where priority should be given to improvement in the throughput by omitting integrity verification over execution of integrity verification that increases the overhead. For this reason, in the present embodiment, data falsification verification is omitted for the non-secure OS 518.

However, it is necessary to prevent falsification of data in the secure OS 517 and the secure VMM 516, even when an attack is made on vulnerability of the non-secure OS 518 or the non-secure OS 518 is taken over by the attacker through falsification of the non-secure OS 518 in the external memory 7. In the present embodiment, the secure OS 517 is enabled to safely coexist even when the non-secure OS 518 is attacked.

To achieve the above, in the present embodiment, the table entries that are included in the page tables from layer 1 to layer N−1 in the page table tree 9 for the non-secure OS 518 are set to invalid states, when the page table tree 9 (for example, a page table having two stages, and hereinafter also referred to as "unverified page table") for the non-secure OS 518 stored in the external memory 7 has N layers. The table entries included in the page tables from layer 1 to layer N−1 in the page table tree 9 for the non-secure OS 518 are set to valid states, when they are copied from the external memory 7 into the internal memory 8.

In the present embodiment, the table entries included in the page table of the layer N in the page table tree 9 for the non-secure OS 518 are set to valid states. The page table of the layer N refers to data.

In the present embodiment, when the page table of the layer N is copied from the external memory 7 into the internal memory 8, verification of falsification is executed for the page table of the layer N. However, in the present embodiment, the data of the non-secure OS 518 stored in the external memory 8 is read based on the page table of the layer N in the secure page table tree 121, and stored in cache memories 507a to 507c, without being stored in the internal memory 8 or verified. The instruction execution unit 505 receives the data of the non-secure OS 518 stored in cache memories 507a to 507c.

For this reason, in the present embodiment, no verification is executed when the data of the non-secure OS 518 is referred to. Consequently, the data referred to by the non-secure OS 518 does not occupy the internal memory 8, and the processing penalty of the information processing device 500 can be reduced.

In addition, in the present embodiment, the address area that can be accessed based on the page table tree 9 stored in the external memory 7 is distinguished from the address area of the work area for the secure OS 517 and the secure VMM 516, to omit verification of data falsification for the non-secure OS 518.

Next, the fourth point of the present embodiment will be explained hereinafter.

In the present embodiment, processing from boot of the information processing device 500 to generation of the page table tree 9 and the verifier tree 10 is safely executed. When the first device includes the information processing device 500 and the second device includes an information processing device of the same type as the information processing device 500, the verifier tree 10 is generated based on a secret key unique to the information processing device 500, to prevent unauthorized use of data performed by copying the contents of the external memory 7 of the first device into the memory of the second device.

Information processing devices 500 of the same type generally use the same initial OS image for boot. After the information processing device 500 obtains the initial OS image, the boot processing is executed, and the OS image is used by the information processing device 500.

In the present embodiment, generation of the page table tree 9 and the verifier tree 10 of the guest OS coexist with the boot processing. In the initial state, neither page table tree 9 nor verifier tree 10 has been generated yet. In the present embodiment, explained is the processing from an unsafe state in which neither page table tree 9 nor verifier tree 10 has been generated yet to a secure state the page table tree 9 and the verifier tree 10 are generated.

In the present embodiment, the secure boot loader 508a is stored in the mask ROM 508 in the processor 501. The secure boot loader 508a is securely booted inside the processor 501, and stored in the internal memory 8. The secure boot loader 508a performs verification to prevent falsification of the boot image of the guest OS.

Typically, signature information is attached to the boot image. The signature information is attached to the whole boot image having a large size. For example, the size of the boot image of the guest OS may be lager than that of the secure internal memory 8. In such a case, it is impossible to store the whole boot image in the internal memory 8 to execute signature verification. When partial boot images obtained by dividing the boot image are stored in the internal memory 8 for signature calculation, the partial boot images the signature calculation of which has already finished and then stored in the external memory 7 may be falsified.

For this reason, in the present embodiment, a partial boot image serving as a part of the boot image of the guest OS is read, the verifier tree 10 is generated for the partial boot image that has been read, and falsification of the partial boot image written to the external memory 7 is detected. Thereby, signature verification for the boot image of the guest OS can be executed securely in the information processing device 500 including the internal memory 8 with a limited size, and falsification of the verified partial boot image can be prevented.

In the present embodiment, signature verification during the boot is performed in parallel with generation of the page table tree 9 and the verifier tree 10, to shorten the boot time in comparison with the case of performing signature verification and generation of the page table tree 9 and the verifier tree 10 separately.

In the present embodiment, processing is started even when the page table tree 9 has a part that has not yet been initialized. Thereby, the guest OS is operable at the time when initialization of the necessary part in the assigned memory area and generation of the page table tree 9 and the verifier tree 10 have been finished, and further the boot time can be shortened, when the guest OS having an enormous memory area assigned is booted.

In the present embodiment initialization state information that designates whether the memory area is available is managed. It is possible to start the service of the guest OS even when the guest OS is still uninitialized for the memory area available in the future, and accelerates the startup.

No page table or verifiers are stored in an uninitialized memory area, and a page table and verifiers are stored therein later. The secure boot loader 508a sets initialization state information designating that the memory area has not yet been initialized, in the highest page table entry referring to the uninitialized memory area. The page table including the page entry in which the initialization state information is set is protected based on the verifier tree 10. Accordingly, even when the attacker changes the page entry including the initialization state information designating the uninitialized state, the attack is detected. In this manner, the information processing device 500 is protected from attack of inserting unauthorized data into the uninitialized memory area.

When the guest OS is going to use an intermediate physical address area corresponding to the uninitialized memory area, the guest OS explicitly issues, to the secure VMM 516, an initialization request for the intermediate physical address area to be used. The secure VMM 516 that has received the initialization request allocates memory areas in the external memory 7 and the internal memory 8, and initializes the memory areas with a predetermined initialization value such as zero. The secure boot loader 508a generates the page table tree 9 and the verifier tree 10, while repeating load of partial boot images.

(Two-stage Address Translation)

FIG. 3 is a block diagram showing an example of a structure for executing two-stage address translation.

Applications 520*a* to 520*c* are executed on the secure OS 517, and applications 521*a* to 521*c* are executed on the non-secure OS 518.

Guest page tables 522*a* to 522*c* of in the secure OS 517 define translation of the applications 520*a* to 520*c* from virtual addresses to intermediate physical addresses, respectively.

Based on the guest page tables 522*a* to 522*c*, the secure OS 517 translates virtual addresses to intermediate physical addresses.

Guest page tables 523*a* to 523*c* of the non-secure OS 518 define translation of the applications 521*a* to 521*c* from virtual addresses to intermediate physical addresses, respectively.

Based on the guest page tables 523*a* to 523*c*, the non-secure OS 518 translates the virtual addresses to the intermediate physical addresses.

A VMM page table 524 of the secure VMM 516 defines translation by the secure OS 517 from intermediate physical addresses to physical addresses.

A VMM page table 525 of the secure VMM 516 defines translation by the non-secure OS 518 from intermediate physical addresses to physical addresses.

Based on the VMM page tables 524 and 525, the secure VMM 516 translates the intermediate physical addresses to the physical addresses.

Only address translation based on the application 520*a* included in the applications 520*a* to 520*c* and 521*a* to 521*c* will now be described. However, address translation based on other applications 520*a* to 520*c* and 521*a* to 521*c* are performed in the same way.

In the two-stage address translation, firstly, in stage 1, address translation by the secure OS 517 is executed, and then in stage 2, address translation by the secure VMM 516 is executed. The secure OS 517 is a guest OS managed by the secure VMM 516. The application 520*a* controlled by the secure OS 517 is associated with the guest page table 522*a*.

The application 520*a* issues an instruction read request and a data access request as virtual addresses. The secure OS 517 translates a virtual address into an intermediate physical address, based on the definition of the guest page table 522*a*. A memory area for the intermediate physical addresses is allocated in advance to each guest OS by the secure VMM 516. Based on the definition of each guest page table, each guest OS allocates the allocated memory area to a currently operating application.

The secure VMM 516 translates an intermediate physical address into a physical address, based on the definition of the VMM page table 524 managed by the secure VMM 516. A request issued as the virtual address is processed using this physical address.

(Data Structure of the Secure Page Table Tree 121)

Figure 4:
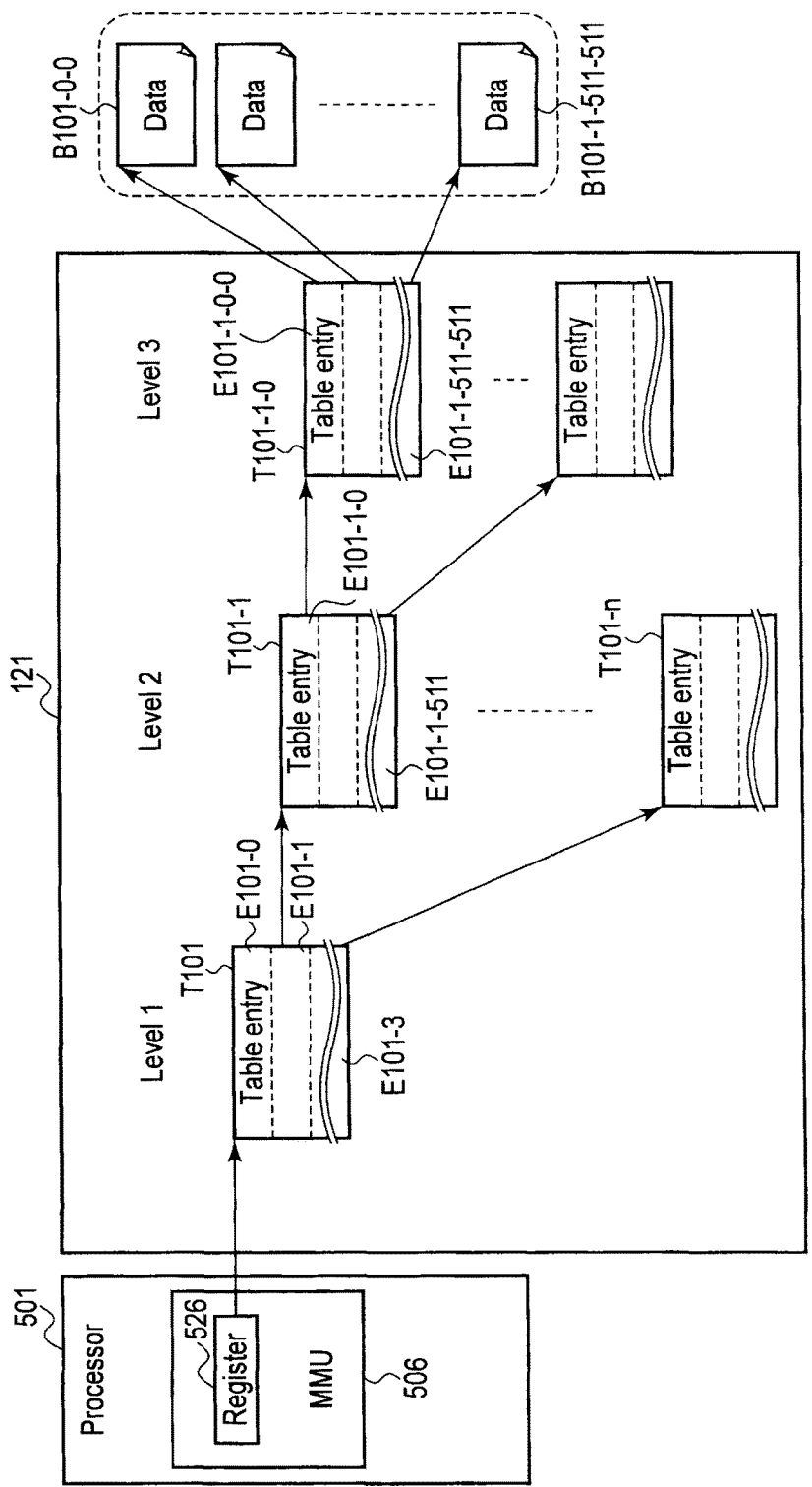
FIG. 4 is a block diagram showing an example of a hardware structure for executing address translation and data reference, and a data structure of a secure page table tree according to the second embodiment.

FIG. 4 is a block diagram showing an example of a hardware structure for executing address translation and data reference, and a data structure of the secure page table tree 121.

The secure page table tree 121 shown in FIG. 4 has a virtual address space of, for example, 4 gigabytes. A data structure of the secure page table tree 121 is applicable to various architectures. In a particular architecture, page table size differs between stages 1 and 2 because of physical page expansion. However, in the present embodiment, a case where page tables of the same format are used between stages 1 and 2 will be described.

The processor 501 includes the MMU 506. The MMU 506 includes a register 526 designating a highest-level table of the secure table tree 121.

The register 526 designates the upper 20 bits of a highest-level page table T101, using a physical address. Lower 12 bits of a page table constituted in units of 4 kilobytes are omitted. The highest-level page table T101 indexed by the register 526 includes table entries E101-0 to E101-3. Each table entry is of 8 bytes, and has an index for a page table of a subsequent level, and a valid/invalid bit designating whether the page table of the subsequent level is valid or invalid.

Reference by each table entry to a page table of a subsequent level is performed using a pointer. Accordingly, page tables T101, T101-1 and T101-0 may be arranged in the memory in an arbitrary order. Similarly, the page tables of the same level, for example, tables T101-1 to T101-n (n is a natural number not less than 2) of level 2, may be arranged in the memory in an arbitrary order.

Table entries E101-1-0 to E101-1-511 in page table T101-1-0 refer to data B101-0-0 to B101-511-511.

FIG. 5 is a conceptual diagram an example of definitions of blocks according to the present embodiment.

In the present embodiment, blocks corresponding to units of pages, which constitute the page table tree 9, the verifier tree 10, the secure page table tree 121 and the secure verifier tree 122, are called page blocks. Both of a table block and a data block are called a page block.

A page table used for address resolution is called a table block.

Data to be actually read or written is called a data block.

A one-page block that can be referred to, using a certain table block, is called a target block.

All page blocks that can be referred to, using a certain table block, are called associated blocks.

A table block as the reference source of a certain page block is called a reference source block.

MAC values and the counter values used for verification are collected in and managed by a respective corresponding table block.

A block including collected MAC values is called a MAC block.

A block including collected counter values is called a counter block.

Combination of a MAC block and a counter block, which correspond to a certain page block, is called a verification block. If there is no counter block, a MAC block corresponding to a page block is set as a verification block.

A verification block corresponding to a certain page block has a format that enables the verification block itself to be associated with a reference source block corresponding to the page block.

(Details of Address Translation)

Referring to FIG. 4, a detailed description will be given of address translation, using, as an example, a case where a virtual address MA01=0x40000000 is issued.

An upper two bits of the virtual address MA01=0x40000000 are 01#b. A table entry E101-1 in the page table T101 indexed by the upper two bits 01#b of the virtual address MA01=0x40000000 is referred to.

Subsequently, address translation is advanced by a subsequent page table pointer included in table entry E101-1. When the virtual address MA01 is 0x40000000, the table entry selected in level 1 is E101-1, and the page table of level 2 referred to by table entry E101-1 is T101-1.

Subsequently, a table entry indexed by bits [29:21] of virtual address MA01 is selected from the page table T101-1 selected in level 2. Notation "bits [A:B]" in a virtual address is supposed to denote a range of from the $A^{th}$ bit of the virtual address to the $B^{th}$ bit. Since bits [29:21] of virtual address MA01 are all zeros, a table entry E101-1-0 is selected from the page table T101-1. A page table of level 3 referred to by the table entry E101-1-0 is T101-1-0.

From the page table T101-1-0 selected in level 3, a table entry indexed by bits [20:12] of the virtual address MA01 are selected. A table entry selected in level 3 is E101-1-0-0.

By the address translation as the above, an upper-level address of data B101-1-0-0 is finally determined.

(Virtualization of Page Table)

Virtualization of a page table will now be described in detail.

Firstly, a description will be given of a memory space and a page table size. The size of a page table that defines entire virtual address space of 4 gigabytes is 8 megabytes or more. Therefore, in order to fixedly allocate page tables to a physical memory, very large memory size is required. In view of this, the secure OS 517 and the secure VMM 516 virtualize page tables.

A page table virtualization is executed using valid/invalid bits in table entries. An example using the table entry E101-1 will be described. When a valid/invalid bit in table entry E101-1 designates an invalid state, the reference destination table T101-1 of the table entry E101-1 does not physically exist. Therefore, when access to this reference destination page is occurred, the MMU 506 generates a processor fault and executes processing of reading the reference destination page into a physical memory. Upon receipt of the fault, the secure OS 517 and the secure VMM 516 stores data corresponding to a reference destination table from the external device 503, such as a hard disk, to a free page of the physical memory, thereby updating the valid/invalid bit in the table entry E101-1 to a valid state and resuming interrupted processing.

By executing the above control, the secure OS 517 and the secure VMM 516 can dynamically allocate a huge virtual address space to a physical memory, whereby a limited-capacity of a physical memory can be used effectively.

A structure and function of the secure page table tree 121 shown in FIG. 4 is applicable to various address translation mechanisms. As will be described later, in the present embodiment, a data structure necessary for memory integrity verification is used, and a memory integrity verification mechanism transparent to guest OSs is realized.

(Several Times of Reference to Page Table Due to Virtualization and Address Translation Caches 509a and 509b)

A description will now be given of several times of reference to a page table due to a virtualization and address translation caches 509a and 509b.

In many architectures, the above-described page-table reference processing is executed by hardware such as an MMU. In a case of two-stage virtualization, the above-described address translation is executed twice, and access to a page table of a guest OS also becomes a target of address translation. For instance, when two-stage address translation is performed, reference to 4×3 page tables is needed at worst.

Whenever access to data is performed, such page-table reference is executed, and the address translation caches 509a and 509b are used for cache a result of translation in order to avoid an increase in overhead.

When performing the two-stage address translation, the MMU 506 stores a guest-OS virtual address and a physical address, which is obtained after the virtual address is subjected twice to address translation, in the address translation caches 509a and 509b in association with each other. In this case, the virtual address is used as a tag. If at a time of subsequent data reference, a virtual address matches with the tag of the address translation cache 509a or 509b, the MMU 506 can obtain a corresponding physical address (can realize address resolution) without performing address translation using the secure page table tree 121. When a plurality of secure page table trees 121 exist, the address translation caches 509a and 509b store identifiers for identifying the secure page table trees 121 in association with address translation information. For instance, as the identifiers, the highest-level addresses of the secure page table trees 121 may be used. As a result, even when a plurality of the same virtual addresses is occurred, a correct physical address can be obtained.

Since address translation is performed for each page, it is sufficient if the virtual and physical addresses have a bit which is upper than page bits (12 bits), respectively.

Although the address translation cache 509b has the same function as the address translation cache 509a, it is larger and slower than the address translation cache 509a.

(Concept of Hierarchization)

A description will be given of a concept of hierarchization.

For instance, to increase the speed of data reference, cache memories are hierarchized in two levels. Further, for instance, a page table tree for address translation is hierarchized in three levels. For instance, virtualization control use a hierarchy of two levels, and address translation controlled by a three-stage page table is executed twice. Such cache-memory levels, a hierarchy of the page table, and times of address translation for a virtualization (stage number) are orthogonal concepts. Logically, arbitrary combination of the concepts is possible. For instance, cache memories may be hierarchized in three levels, each page table tree for address translation may be hierarchized in three levels, and address translation for virtualization may be executed in two stages.

FIG. 6 is a block diagram showing an example of a concept of a data acquisition and address translation by the information processing device 500 according to the present embodiment.

The instruction execution unit 505 acquires data from the internal memory 8 when there is no data in cache memory 507a, 507b and 507c.

The instruction execution unit 505 transmits a virtual address to the MMU 506 when address translation is necessary.

Based on address translation information stored in the address translation cache 509a or 509b, the MMU 506 executes two-stage address translation based on the secure page table tree 121, when a virtual address cannot be translated to a physical address.

In the address translation, when a page fault is occurred in a page table or data, this page table or data is copied from the external memory 7 to the internal memory 8, based on paging.

(Initial State of Information Processing Device 500)

Assuming that the above-described address translation and virtualization mechanism are used, an initial state of the information processing device 500 according to the present embodiment will be described.

In the initial state, the secure VMM 516, and the secure OS 517 and the non-secure OS 518, managed by the secure VMM 516, are in a dormant state. Namely, the secure VMM 516, the secure OS 517 and the non-secure OS 518 are retreated in the nonvolatile external memory 7.

In the present embodiment, key information and MAC values as a root of trust associated with integrity and secrecy of the secure VMM 516 and the secure OS 517 are stored in the processor 501. More specifically, the processor 501 includes a key storage unit 513. The key storage unit 513 stores a secret key and root verification information 13. When the processor 501 has no rewritable memory area, it may use a nonvolatile memory in an external trusted platform module (TPM) bound as a secure memory based on a fixed key stored in the key storage unit 513. Information of the TPM can be reliably associated with a particular processor by performing authentication between the TPM and the processor 501 of a host.

(Memory Map and Entities)

Figure 7:
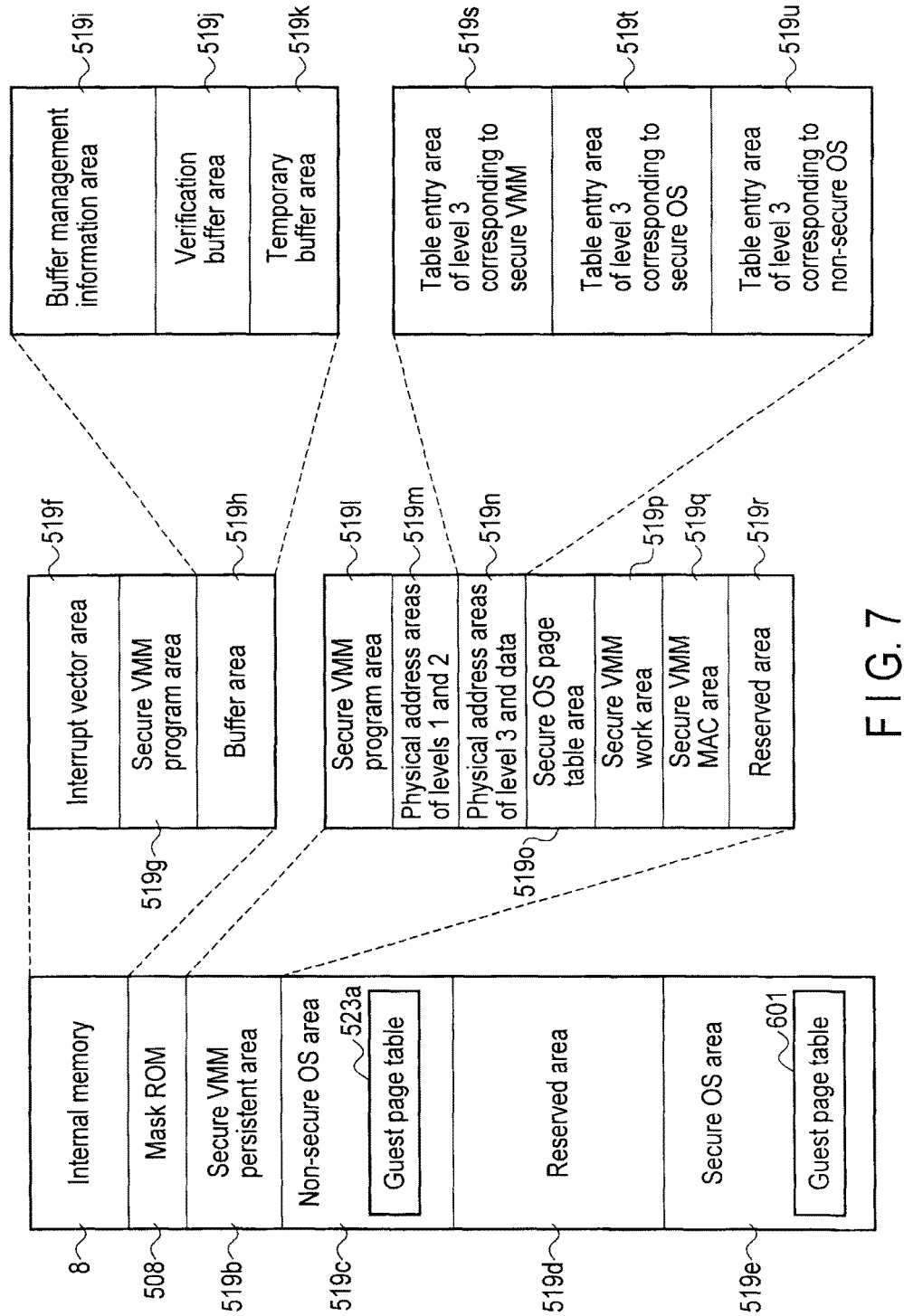
FIG. 7 is a view showing an example of a memory map according to the second embodiment.

FIG. 7 is a view showing an example of the memory map according to the present embodiment.

A memory in the information processing device 500 includes, for example, the internal memory 8, a mask read-only memory (ROM) 519a, a secure VMM persistent area 519b, a non-secure OS area 519c, a reserved area 519d and a secure OS area 519e. The internal memory 8 includes an interrupt vector area 519f, a secure VMM program area 519g, and a buffer area 519h. The buffer area 519h includes a buffer management information area 519i, a verification buffer area 519j and a temporary buffer area 519k. The secure VMM persistent area 519b, the non-secure OS area 519c, the reserved area 519d and the secure OS area 519e are allocated in the external memory 7.

The secure VMM persistent area 519b includes secure VMM program area 519g, physical address areas 519m and 519n, a secure OS page table area 5190, a secure VMM working area 519p, a secure VMM MAC area 519q, and a reserved area 519r. The physical address area 519m stores page tables of levels 1 and 2, counter values and MAC values. The physical area 519n stores page tables of level 3, counter values and MAC values of page tables. Further, the physical address area 519n stores data, and counter values and MAC values of the data. The physical address area 519n of level 3 includes an entry area 519s of level 3 corresponding to the secure VMM 516, an entry area 519t of level 3 corresponding to the secure OS 517, and an entry area 519u of level 3 corresponding to the non-secure OS 518.

The secure VMM 516 is booted securely. A kernel portion of the secure VMM 516 that executes verification is resident in a secure memory and protected from a falsification attack against the external memory 7. In the present embodiment, the internal memory 8 within the chip of the processor 501 is used as the secure memory. In the present embodiment, a memory verification function of the secure VMM 516 is realized by a memory verification program resident in the internal memory 8. A program, such as a program for realizing a device virtualization function, included in the secure VMM 516 and excluding the memory verification program, may be stored in the internal memory 8 in an on-demand manner by paging and verification described later, and executed.

The secure VMM 516 stored in the external memory 7 is verified at the time of, for example, activation, based on a program stored in the mask ROM 508, and is then stored in the program area 519g in the secure VMM 516 in the internal memory 8.

The verifier tree 10 is stored in the secure VMM persistent area 519b in the external memory 7. A portion of the verifier tree 10 verified by the secure VMM 516 is stored in the verification buffer area 519j in the buffer area 519h in the Internal memory 8.

The buffer area 519h is a data area used by the secure VMM 516. The buffer management information area 519i stores buffer management information, and a translation list used by the secure VMM 516. The verification buffer area 519j stores verification target data. An unused area in the verification buffer area 519j is called a verification buffer free area. The temporary buffer area 519k stores temporarily used data at a time of verification of the secure VMM 516. The buffer management information in the buffer area 519h designates a state of use of the buffer area 519h. For example, the buffer management information includes the type, amount, frequency of use, etc., of data stored or not stored.

The memory map further includes the storage area 519d of the non-secure OS 518, and the storage area 519e of the secure OS 517.

(Verification Calculation Method)

A method for verification calculation according to the present embodiment will be described.

A description will hereinafter be described, assuming that a page size is 4096 bytes, an address size is 8 bytes (64 bits), and a counter size is 16 bytes (128 bits). However, each size is not limited to the above, and may be set to other values.

Parameters used for the verification calculation will be described below.

Addr is a leading address in a verification target page table.

D[Addr] is data corresponding to i pages beginning with Addr, i being an arbitrary natural number.

Ctr[Addr] is a counter value associated with a page beginning with Addr.

K is a secret value used in common in the entire memory area, and is always stored within the processor 501.

Ek is a j-bit block ciphertext based on secret key K. In the present embodiment, it is assumed that encryption algorithm is AES128 where j=128. For instance, a block length is assumed to be 16 bytes (128 bits). However, encryption algorithm other than AES128 may be used.

"Padding" expresses padding.

For encryption calculation, notation "Y=MAC[Ek](X)" is used. A MAC value of Y is calculated by applying fixed length CMAC algorithm of a common-key block base based on the secret key K to [X0, X1, . . . , Xn] obtained by dividing an input X into portions of a common-key block size. The data size of either of the MAC value Y and the secret key k is identical to the common-key block size. When the input X cannot be divided into portions of the common-key block size, Padding is used.

The MAC value Y of data D[Addr] corresponding to i pages beginning with the address Addr is calculated by the following expression, based on [D0, D1, D2 . . . D255i] obtained by dividing D[Addr] into portions of the common-key block size, and counter value Ctr[Addr] associated with D, address Addr and Padding:

Y=MAC[Ek]([D0, D1, . . . , D255i]||Ctr[Addr]||Addr||Padding)

D[Addr], Ctr[Addr] and Addr may be input in an arbitrary order. Padding may not be used if the input to the MAC function can be divided into portions of the common-key block size. The size of the data D[Addr] beginning with the address Addr may differ even in the same verifier tree, in accordance with a structure of a verifier tree.

Ctr[Addr] is used for version management of verification target data. Accordingly, when data is read in, Ctr[Addr] is used directly. When the data is rewritten, Ctr[Addr] is incremented and then used.

In the present embodiment, the address Addr will be described as an address for the external memory V. However, the address Addr may be an intermediate address.

(Structure of Secure Verifier Tree 122)

A data structure of the secure verifier tree 122 will be described.

In the present embodiment, address resolution and data verification are simultaneously executed by matching a data structure of the secure page table tree 121 with a data structure of the secure verifier tree 122.

A tree structure (MAC tree structure) constituting page tables and MAC values will be described as a first data structure of the secure page table tree 121 and the secure verifier tree 122. A tree structure (MAC 4 counter structure) formed of page tables, MAC values and counter values for managing versions will be described as a second data structure of the secure page table tree 121 and the secure verifier tree 122.

In the present embodiment, each table block and a corresponding counter block are allocated in a continuous address space, each table block and a corresponding counter block may be allocated in separated address spaces.

(MAC Tree Structure)

FIG. 8 is a data structure diagram showing an example of a MAC tree structure of the secure page table tree 121 and the secure verifier tree 122.

A MAC value of a respective data block is generated based on a content of the data block and its address, and the generated MAC value is managed by a MAC block associated with (related to) a reference source block that refers to the data block. As described above, the MAC block corresponds to a verification block.

On the other hand, a MAC value used for verification of a respective table block is generated based on the content of the table block, a content of a MAC block associated with the table block, and an address of the table block. The generated MAC value used for the verification of the table block is managed by a MAC block associated with a reference source block that refers to the table block, like the MAC value of the data block. By repeating this operation, a large-scale tree structure using one MAC block as a vertex is finally formed.

For instance, a MAC value M201-1-0-511 of data block B201-1-0-511 is generated based on a data block B201-1-0-511 and its address addr(B201-1-0-511). Further, a MAC value M201-1-0 used for verification of a table block T201-1-0 is generated based on a table block T201-1-0, a MAC block T202-1-0 associated with a table block T201-1-0, and an address addr(T201-1-0) of the table block T201-1-0. A MAC value M201-1-0-511 of a data block B201-1-0-511 is included in a MAC block T202-1-0 associated with a reference source block T202-1-0, and a MAC value M201-1-0 of a table block T201-1-0 is included in a MAC block T202-1 associated with a reference source block T202-1.

To guarantee legitimacy in the MAC tree structure, a table block and a MAC block associated with the table block are simultaneously read-in and verified. For instance, when a table block T201-1-0 is read-in, a MAC block T202-1-0 is read in simultaneously with table block T201-1-0, and verification is executed using the table block T201-1-0 and MAC block T202-1-0. In the MAC tree structure, the legitimacy of a lower-level block (child block) is guaranteed by a MAC block associated with an upper-level block (parent block). Accordingly, when a lower-level block is verified, it is necessary that a MAC block associated with a corresponding upper-level block is already verified.

(MAC+ Counter Structure)

Figure 9:
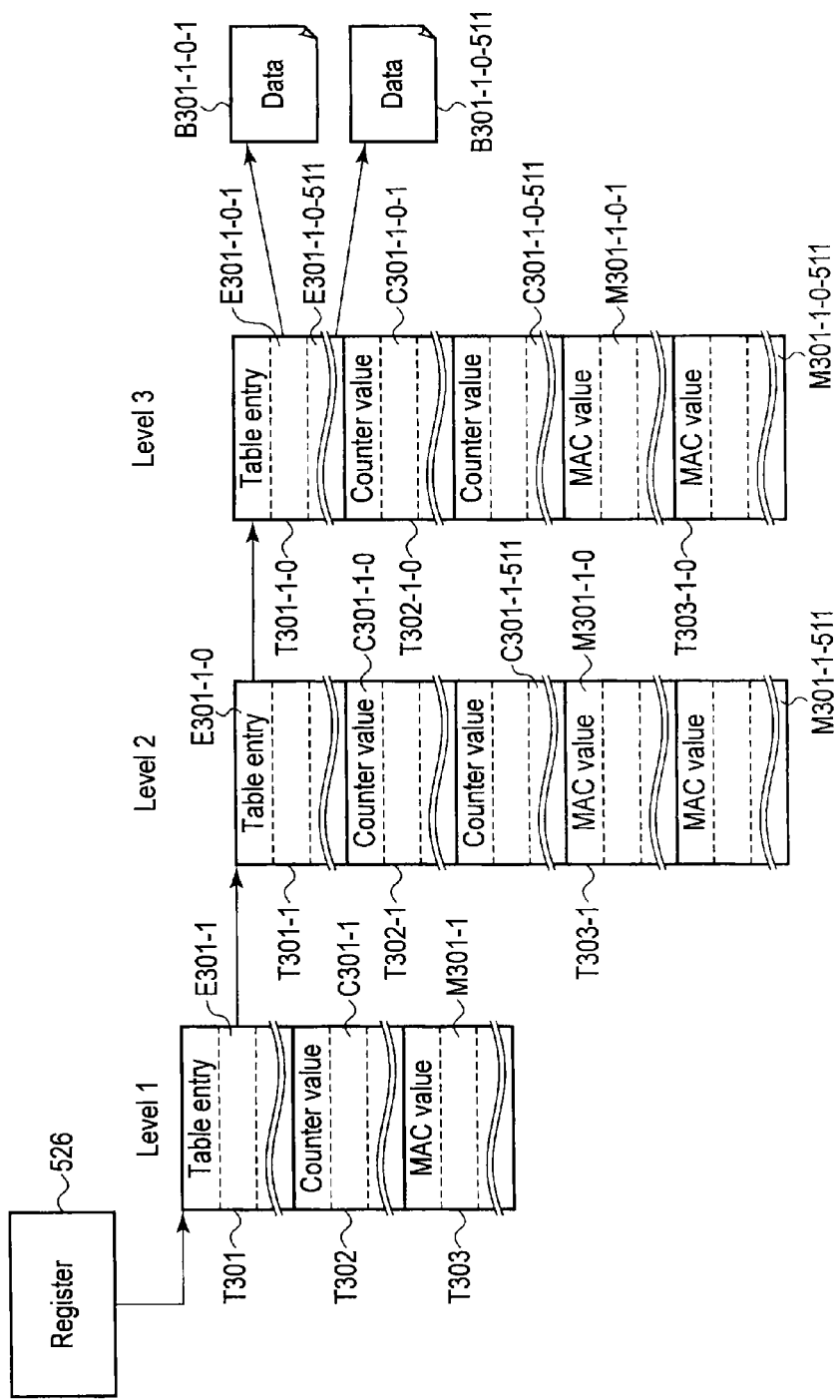
FIG. 9 is a data structure diagram showing an example of a MAC+ counter structure of a secure page table tree and secure verifier tree according to the second embodiment.

FIG. 9 is a data structure diagram showing an example of a MAC+ counter structure of the secure page table tree 121 and secure verifier tree 122 according to the present embodiment.

A counter value is set for each table entry, and is used for version management of a corresponding target block. It is sufficient if the counter value satisfies a condition that a duplication of values is avoided, and the counter value may be changed whenever data or a page table is updated. The counter value is not required to be counted up or down.

A MAC value of a respective data block is generated based on a content of a data block, and an allocated and a counter value thereof. The used counter value and the generated MAC value of the data block are managed by a counter block and a MAC block associated with a corresponding reference source block. In contrast, a MAC value of a respective table block is generated based on the table block, a counter block associated with the table block, an allocated address of the table block, and a counter value of the table block. The used counter value and the generated MAC value of the table block are managed by a counter block and a MAC block associated with a corresponding reference source block. By repeating this operation, a small-scale tree data structure can be formed, in which version management is performed using a counter block included in a verification block associated with a one-level higher table block, and verification is executed using a MAC block.

For instance, a MAC value M301-1-0-511 of a data block B301-1-0-511 is generated based on the data block B301-1-0-511, an address addr(B301-1-0-511) and a counter value C301-1-0-511.

On the other hand, a MAC value M301-1-0 of a table block T301-1-0 is generated based on a table block T301-1-0, a counter block T302-1-0, an address addr(T301-1-0) and a counter value C301-1-0 of a table block T301-1-0.

A counter value C301-1-0-511 and MAC value M301-1-0-511 of data block B301-1-0-511 are included in a counter block T302-1-0 and MAC block T303-1-0 associated with reference source block T301-1-0.

A counter value C301-1-0 and MAC value M301-1-0 of a table block T301-1-0 are included in a counter block T302-1 and MAC block T303-1 associated with a reference source block T301-1.

In the MAC+ counter structure, when a table block is read-in, it is necessary to simultaneously read-in and verify the table block and a counter block associated with the table block. However, it is not necessary to simultaneously read-in or verify the table block and a MAC block associated with the table block. This is because to generate a correct MAC value for a certain page block, a counter value associated with the upper-level block of the page block is necessary, but a corresponding MAC block itself is irrelevant to a MAC value generation.

(Secure Page Table Tree 121 and Page Table Tree 9)

Figure 10:
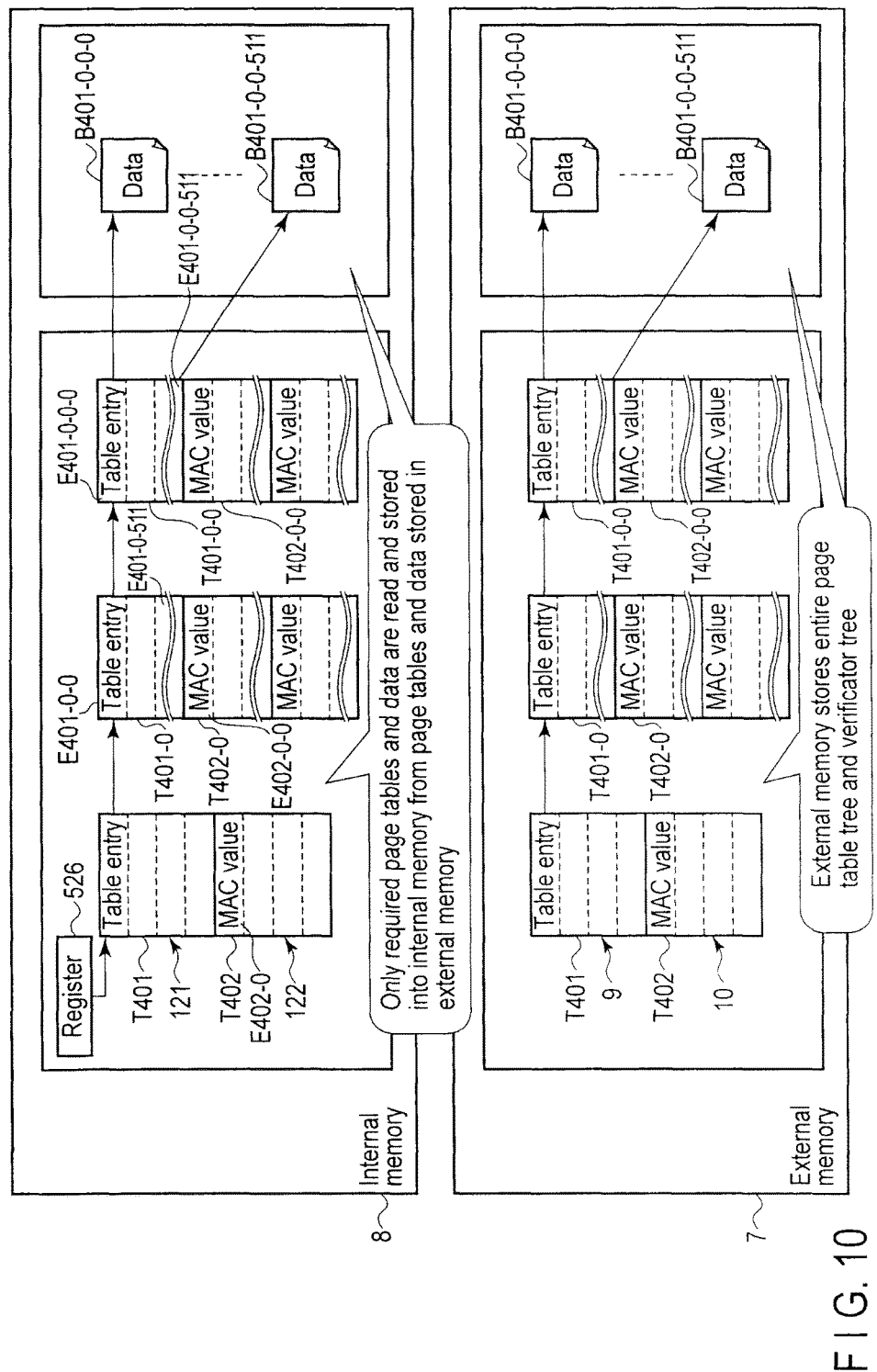
FIG. 10 is a data structure diagram showing an example of a relationship between a secure page table tree and page table tree.

FIG. 10 is a data structure diagram showing an example of a relationship between the secure page table tree 121 and page table tree 9.

The internal memory 8 stores the secure page table tree 121 used for address translation. The register 526 refers to a highest-level table T401 in the secure page table tree 121 in the internal memory 8. Based on a definition of the secure page table tree 121 to be referred to by the register 526, translation to a physical address is executed, and reference to a memory executed by the instruction execution unit 505.

Entire page table tree 9 as source data for generating the secure page table tree 121 in the internal memory 8 is stored in the external memory 7. In the present embodiment, the page table tree 9 stored in the external memory 7 is not directly referred to as an address translation table. The page table tree 9 does not have a special function except for that it is source data of the secure page table tree 121. Since it is possible that the page table tree 9 in the external memory 7 will be falsified, direct use of the page table tree 9 for address translation without verification is avoided in the present embodiment. Instead, the secure page table tree 121 stored in the internal memory 8 is used for address translation. The secure page table tree 121 is a subset of the page table tree 9.

The information processing device 500 according to the present embodiment copies, to the internal memory 8, necessary portions of the page table tree 9 and data stored in the external memory 7, and executes, on them, verification based on secure verifier tree 122, thereby adding the necessary portions to the secure page table tree 121 and the data already stored in the internal memory 8. If a page table or data that is not stored in the internal memory 8 is referred to, the information processing device 500 generates a page default to thereby cause the secure VMM 516 to the verify necessary portions of the page table tree 9 and data, and stores the necessary portions in the internal memory 8 if the verification result designates validity.

(Storage Destination and Address of Data Block, Structure of Page Table Tree 9 in External Memory 7)

The storage destination and address of a data block and the structure of the page table tree 9 in the external memory 7 will be described blow.

In the present embodiment, a page block stored in the external memory 7 is temporarily copied to the internal memory 8 protected from physical falsification, then processed and then returned to the external memory 7.

Because of this, the same page block may be stored in association with an address in the external memory 7 and with an address in the internal memory 8. For simplifying the description, an address of an area in the external memory 7 that stores a data block B401-0-0-511 is set to Eaddr (B401-0-0-511). An address of an area in the internal memory 8 that stores a data block B401-0-0-511 is set to Iaddr(B401-0-0-511). In a strict sense, an address in the internal memory 8 is dynamically allocated in the verification buffer area 519j. Accordingly, a value of Iaddr(B401-0-0-511) even for the same data block B401-0-0-511 varies whenever this block is read-in. However, in the following description given of a series of read-in and write-out operations, this change does not have to be considered, and then the address of the data block B401-0-0-511 in the internal memory 8 is simply expressed to as Iaddr(B401-0-0-511).

Each entry in a page table stored in the external memory 7 holds an address of a target block, such as Eaddr(B401-0-0-511), in the external memory 7. However, a page table entity recognized by the MMU 506 is not a page table stored in the external memory 7 but a page table stored in the internal memory 8 and already verified. Thus, the MMU 506 refers to a page table stored in the internal memory 8 and already verified. For instance, in FIG. 10, an address of an entity referred to by the register 526 is Iaddr(T401). An address Eaddr(T401-0-0) in the external memory 7 to a page table T401-0-0 is set at the time of a page table construction, and address resolution can be executed by performing verification read-in in an order beginning with a highest-level page table T401. In contrast, an address Iaddr(T401-0-0) in the internal memory 8 to the page table T401-0-0 is determined when a memory is allocated in the temporary buffer area 519k in the internal memory 8.

(Processing Until Verification Processing)

A description will be given of a flow until occurrence of verification processing.

Figure 11:
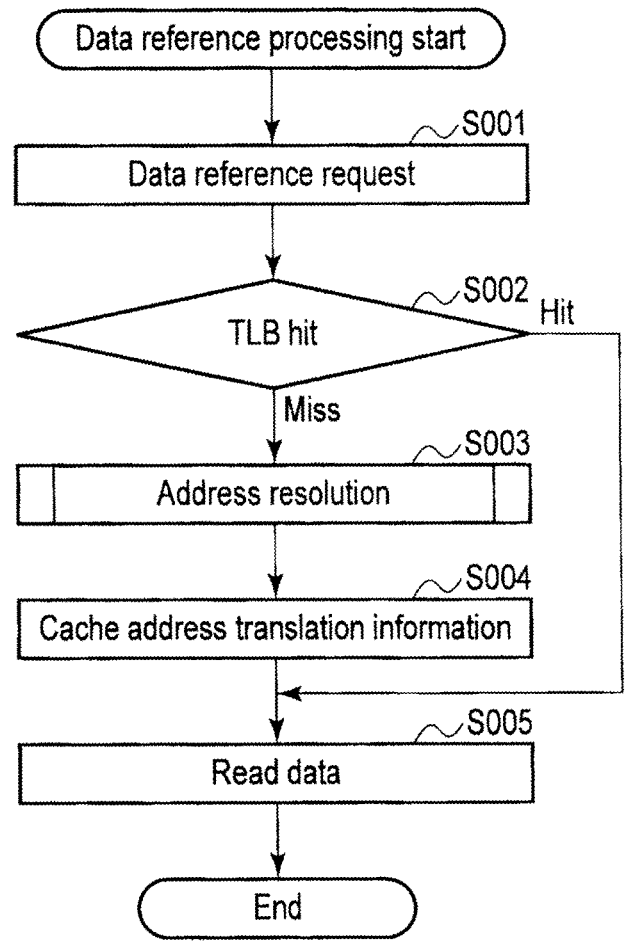
FIG. 11 is a flowchart showing an example of data reference processing according to the second embodiment.

FIG. 11 is a flowchart showing an example of data reference processing according to the present embodiment.

FIG. 11 shows a flow before verification processing according to the present embodiment is performed. Assume that address translation described below is processing using a page table of stage 2, and address translation by a guest OS using a page table of stage 1 is already finished.

The instruction execution unit 505 issues a data reference request to the MMU 506 in step S001.

In step S002, the MMU 506 confirms whether the address translation cache 509a or 509b caches address translation information associated with a virtual address and a physical address.

If the address translation cache 509a or 509b caches the address translation information (TLB hit), the processing proceeds to step S005.

If the address translation cache 509a or 509b caches no address translation information (TLB miss), the MMU 506 performs address resolution processing in step S003, and caches, in step S004, resolved address translation information in the address translation cache 509a or 509b.

In step S005, the MMU 506 reads data, to be referred to, from the solved physical address.

Figure 12:
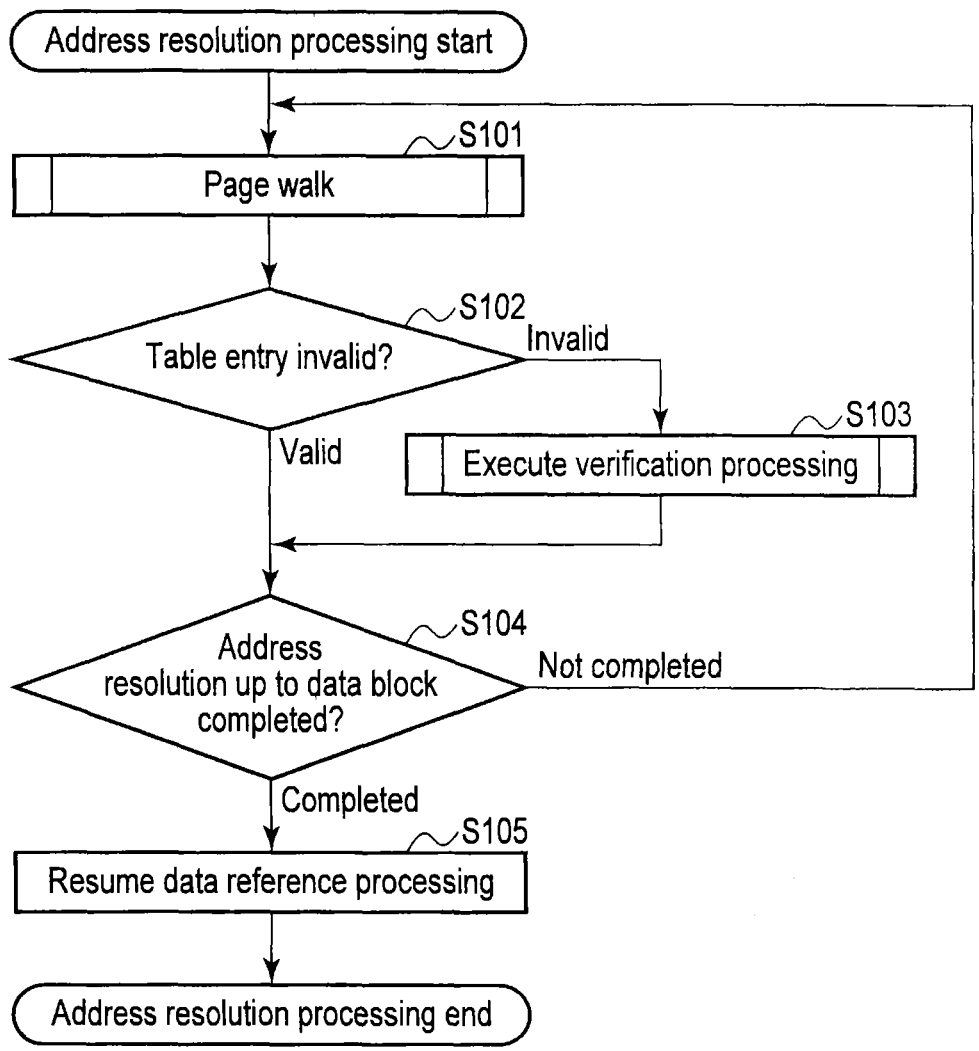
FIG. 12 is a flowchart showing an example of address resolution processing according to the second embodiment.

FIG. 12 is a flowchart showing an example of the address resolution processing according to the present embodiment.

The address resolution processing shown in FIG. 12 is executed in the data reference processing.

In step S101, when the address resolution processing is started, the MMU 506 executes address resolution using a page walk.

In step S102, the MMU 506 checks, during the page walk, whether a table entry designates a valid state.

If the table entry exhibits the valid state, the program proceeds to steps S104.

In contrast, if the table entry is invalid, control is transferred from the MMU 506 to the secure VMM 516, and the secure VMM 516 executes, in step S103, verification processing of a page block referred to by the invalid table entry. After finishing the verification processing, the invalid table entry is validated by the secure VMM 68, and control is transferred from the secure VMM 516 to the MMU 506. In step S104, the MMU 506 checks whether the address resolution up to a data block is completed.

If the address resolution is not completed, the address resolution processing returns to step S101. As a result, a page walk is repeated until the address resolution processing is completed.

If the address resolution is completed, the MMU 506 resumes the data reference processing in step S105, thereby finishing the address resolution processing.

As described above, the verification processing is sequentially executed by the secure VMM 516 during the address resolution processing based on a page fault of the page table tree in stage 2. In the page walk, paging of a table block and a data block may be performed simultaneously. In this case, the number of times of control transfer between the secure VMM 516 and the MMU 506 can be reduced.

(Structure of Information Processing Device 500)

FIG. 13 is a block diagram showing an example of a structure of the information processing device 500 of the present embodiment.

The information processing device 500 includes the instruction execution unit 505, an address translation cache 527, the MMU 506, a verification management unit 529, a verification information generation unit 531, an external read unit 532, an external write unit 534, a storage area management unit 535, a verification storage unit 536, a key storage unit 513 and the external memory 7.

The MMU 506 includes an address resolution unit 537.

The verification management unit 529 includes a verification information acquisition unit 540, a falsification determination unit 539 and a verification information calculation unit 541.

The storage area management unit 535 includes a reference relationship update unit (page-table reference relationship update unit) 546, a buffer area management unit 547, and a buffer write management unit (verification buffer write management unit) 548.

The address translation cache 527 and the MU 506 correspond to the address translation unit 3. The address translation cache 527 corresponds to the address translation caches 509*a* and 509*b*.

The external read unit 532 and the external write unit 534 correspond to the external input/output unit 2.

The verification information calculation unit 541 and the verification information generation unit 531 correspond to the verification calculation unit 4.

The alteration determination unit 539 corresponds to the verification unit 5.

The reference relationship update unit 546 corresponds to the update unit 6.

The buffer area management unit 547 and buffer write management unit 548 correspond to the replacement management unit 40.

The verification storage unit 536 corresponds to the internal memory 8.

(Relationship Between Data Reference Processing and Structure of Information Processing Device 50)

A relationship between each structural element of FIG. 13 and the above-described flowcharts of FIGS. 11 and 12 will be described.

The instruction execution unit 505 issues a data reference request in step S001, and inquires of the address translation cache 527 in step S002 whether a physical address corresponding to a virtual address of a guest OS is cached.

If the address translation cache 527 does not cache the physical address corresponding to the virtual address required to be refer to, the address resolution unit 537 of the MMU 506 executes address resolution processing in step S003.

In the address resolution processing, the MMU 506 executes a page walk in step S101, and checks, in step S102, a table entry E301-1 in a table block T301 stored in the verification storage unit 536.

If the table entry designates a valid state, the processing proceeds to step S104.

In contrast, if the table entry is an invalid state, the MMU 506 notifies this result is notified to the verification management unit 529. The verification management unit 529 receiving the result executes, in step S103, verification processing of a page block referred to by the table entry. After finishing the verification processing, the verification management unit 529 informs the reference relationship update unit 546 of the end of the verification processing, and the reference relationship update unit 546 changes the invalid state of the table entry to a valid state. Thereafter, control is transferred from the verification management unit 529 to the MMU 506 since read-in is completed.

In step S104, the MMU 506 checks whether address resolution is completed up to a data block. When the address resolution is not completed, the processing returns to the page walk of step S101.

When the address resolution is completed, the MMU 506 resumes the data reference processing in step S105, thereby finishing the address resolution processing.

When the address resolution is completed, the verification management unit 529 and the storage area management unit 535 store page tables, needed for the address resolution and already verified, in the buffer area 519*h* dynamically secured in the verification storage unit 536.

In step S004, the MMU 506 caches, in the address translation cache 527, address translation information designating a result of the address resolution.

When the address translation cache 527 caches a physical address corresponding to a virtual address requested to be referred to, or when address resolution is executed, the MMU 506 reads in data in step S005, using the corresponding physical address.

When address translation information is stored in the address translation cache, and data reference is already completed, verified data is stored in the verification storage unit 536. The address translation cache 527 stores an address for a buffer of the verification storage unit 536. A verified physical address is sent from the address translation cache 527 to the verification storage unit 536, and data in the verification storage unit 536 corresponding to the verified physical address is returned to the instruction execution unit 505 in step S005.

(Tree Verification Processing)

Tree verification processing is performed for data of each page. The secure VMM 516 reads data that has caused page fault from the external memory 7 into the internal memory 8, and executes tree verification for the data. In the tree verification processing, replacement processing and flush processing occur, if necessary. Tree verification processing may occur in the address settlement processing in FIG. 12.

Figure 14:
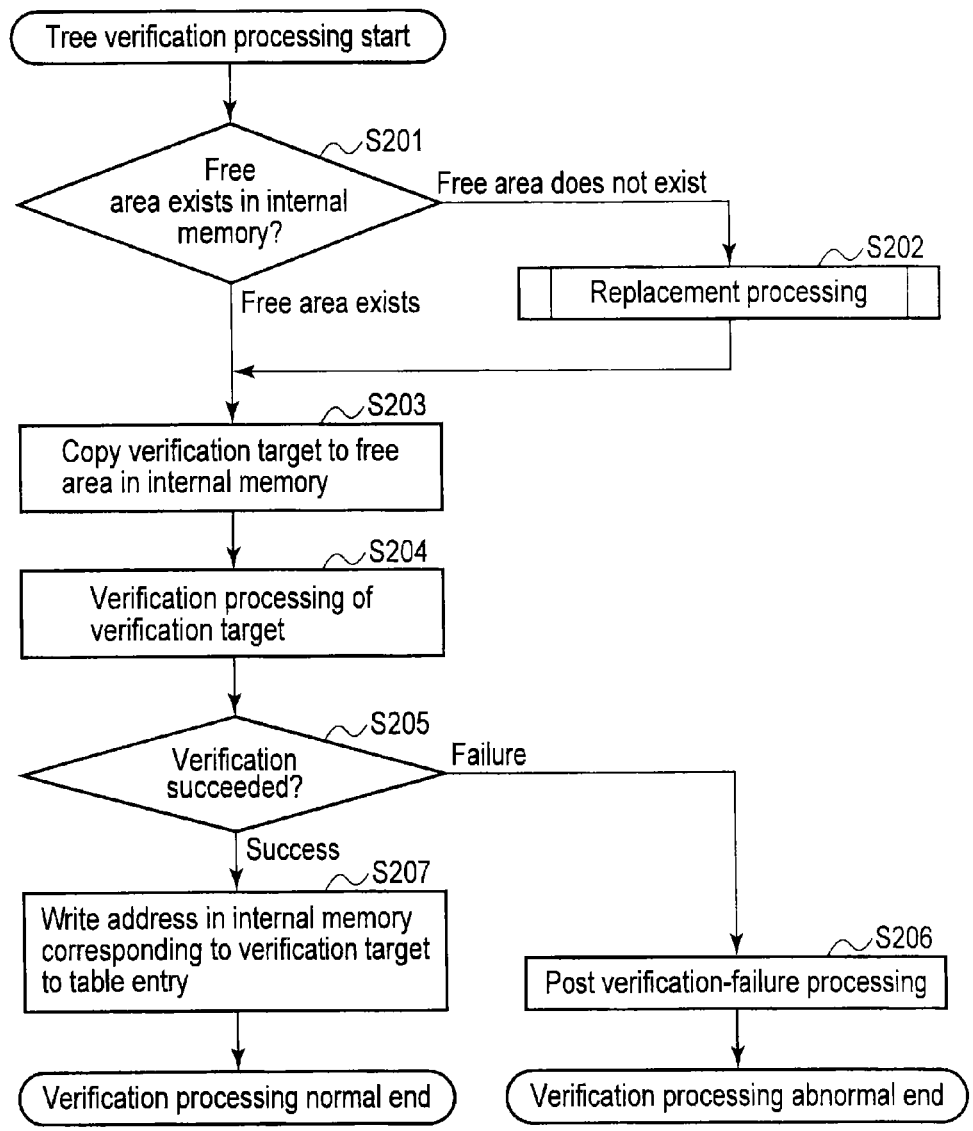
FIG. 14 is a flowchart showing an example of tree verification processing according to the second embodiment.

FIG. 14 is a flowchart showing an example of verification processing according to the present embodiment.

The secure VMM 516 starts tree verification processing of data, and checks in step S201 whether the verification buffer area 519*j* in the internal memory 8 has a free area. When the verification buffer area 519*j* has no free area, the secure VMM 516 releases an area by replacement processing in step S202.

Subsequently, in step S203, the secure VMM 516 copies to-be-verified data from the external memory 7 to the free area in the verification buffer area 519*j* in the internal memory 8. At this time, the secure DMA controller 511 generates a MAC value of read data, based on a generation method defined by the MAC tree structure or the MAC+ counter structure.

In step S204, the secure VMM 516 executes falsification verification of verification target data, based on the generated MAC value. When in the falsification verification, it is necessary to read a MAC value from the external memory 7, the secure VMM 516 reads, from the external memory 7, the MAC value corresponding to verification target data, and stores the read MAC value in the temporary buffer area 519*k* in the internal memory 8. When the MAC value in the internal memory 8 is used, the secure VMM 516 reads, from the internal memory 8, MAC value corresponding to verification target data, and stores the read MAC value in the temporary buffer area 519*k*. Then, the secure VMM 516 compares the MAC value stored in the temporary buffer area 519k with the MAC value generated by the secure DMA controller 511.

When in step S205, the MAC values do not match each other, the secure VMM 516 determines that the verification is failed, and transfers control to post-verification-failure processing in step S206. In step S206, the secure VMM 516 performs, for example, error processing in the post-verification-failure processing, and thereafter leads the verification processing to termination.

When in step S205, the MAC values match each other, the secure VMM 516 determines that the verification is succeeded. In this case, in step S207, the secure VMM 516 changes a reference destination address in a table entry set as invalid into an address of the internal memory 8 corresponding to verification target data. At this time, an address of the external memory 7 corresponding to data is stored in the buffer management information area 519i in the unit of buffer block. Thereafter, the secure VMM 516 finishes the verification processing.

Tree verification processing differs between the case of verifying a data block and the case of verifying a table block.

(Replacement Processing)

FIG. 15 is a flowchart showing an example of replacement processing according to the present embodiment. The replacement processing shown in FIG. 15 may occur in the verification processing of FIG. 14.

In the replacement processing, the same type of data as a replacement source is selected as a replacement target, using replacement algorithm. Namely, at a time of table block replacement, a table block is selected. At a time of data block replacement, a data block is selected. As the replacement algorithm, Least Recently Used (LRU) is used. However, a replacement target may be selected using another replacement algorithm. In the present embodiment, explained is the case of using, when a table block is selected as a replacement target, the selected replacement target table block and an associated block dependent on the replacement target table block as replacement targets.

The secure VMM 516 starts replacement processing, and selects a replacement target in the internal memory 8 based on, for example, LRU in Step S301. When the replacement target is a table block, the secure VMM 516 determines the replacement target table block and an associated block dependent on the replacement target table block as replacement targets.

In Step S302, the secure VMM 516 selects a flush target from the replacement targets. When a table block and a data block exist as the flush targets, the secure VMM 516 selects the data block with priority.

In step S303, the secure VMM 516 executes flush processing.

After the flush processing is finished, in Step S304, the secure VMM 516 checks whether any replacement target still exists in the internal memory 8.

When any replacement target exists in the internal memory 8, the processing in and after Step S302 is repeated until no replacement target exists in the internal memory 8. When no replacement target exists in the internal memory 8, the secure VMM 516 finishes the replacement processing. The reason why it is checked whether a replacement target exists in the internal memory 8 lies in that if the replacement target is a table block as described later, a target block must be flushed depending upon a policy of buffer management, and such flush may be required several times.

After finishing the above-described replacement processing, a free area is secured in the verification buffer area 519j in the internal memory 8.

(Flush Processing)

Figure 16:
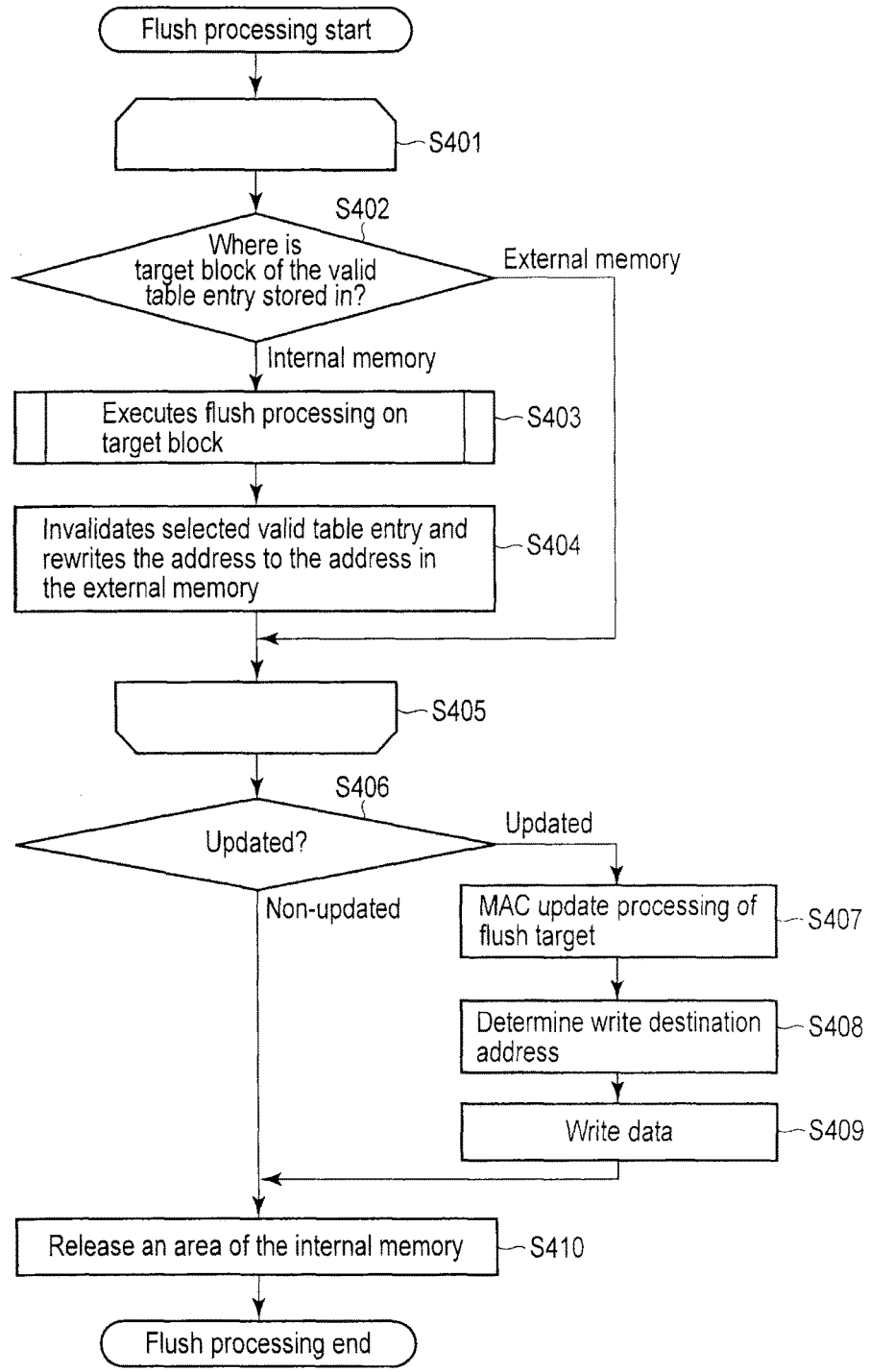
FIG. 16 is a flowchart showing an example of flush processing according to the second embodiment.

FIG. 16 is a flowchart showing an example of flush processing according to the present embodiment. The flush processing shown in FIG. 16 occurs in the replacement processing of FIG. 15.

For example, the buffer management information area 519i in the internal memory 8 stores a translation list in which an address in the external memory 7 for each data and page table is associated with an address in the internal memory 8. Instead of the method using a translation list, another method such as reverse page walk may be used for translation between the address Iaddr in the internal memory 8 and the address Eaddr in the external memory 7.

The following explanation of FIG. 16 illustrates an example of flush processing for table block T401-0 of level 2 that is read into the internal memory 8 in above FIG. 10.

The secure VMM 516 starts flush processing, and executes the loop processing from Step S401 to Step S405 for all table entries E401-0-0 to E401-0-511 in table block T401-0 serving as flush target.

In the following explanation, suppose that E401-0-0 is the only valid table entry in table entries E401-0-0 to E401-0-511, and reference destinations of the other table entries E401-0-1 to E401-0-511 have not been read into the internal memory 8.

In Step S402 in the loop from Step S401 to Step S405, the secure VMM 516 selects the valid table entry E401-0-0, and determines whether target block T401-0-0 of the valid table entry E401-0-0 is stored in the external memory 7 or the internal memory 8.

When the target block is stored in the external memory 7, the processing goes to Step S405.

In this example, because target block T401-0-0 is stored in the internal memory 8, Steps S403 and S404 are executed.

In Step S403, the secure VMM 516 executes flush processing of target block T401-0-0. In this example, the flush processing in FIG. 16 is recursively executed on target block T401-0-0.

In Step S404, the secure VMM 516 invalidates selected valid table entry E401-0-0, and rewrites the address to be stored in selected valid table entry E401-0-0, to the address Eaddr (T401-0-0) in the external memory 7 of target block T401-0-0 written back from the internal memory 8 to the external memory 7 in Step S403. The flush processing of target block T401-0-0 will be described later, and processing performed after the loop from Step S401 to Step S405 will be explained hereinafter. Because all the other table entries E401-0-1 to E401-0-511 in table block T401-0 as flush target to be flushed are invalid, the processing thereafter escapes from the loop processing from Step S401 to Step S405, and moves to Step S406.

In Step S406, the secure VMM 516 checks whether the contents of table block T401-0 as flush target have been updated.

When the table block has not been updated, the secure VMM 516 goes to release of the area in Step S410.

When the table block has been updated, in Step S407, the secure VMM 516 calculates a MAC value for verifying table block T401-0 as flush target, and stores the MAC value in table entry E402-0 in the MAC block T402.

In Step S408, the secure VMM 516 determines a write destination address in the external memory 7 for table block T401-0 as flush target.

In Step S409, the secure VMM 516 writes table block T401-0 as flush target and the MAC block T402-0 associated with table block T401-0 to the external memory 7.

In Step S410, the secure VMM 516 releases the area in the internal memory 8, and finishes the flush processing.

Next, the flush processing for target block T401-0-0 in the above Step S403 will be explained hereinafter.

Suppose that two table entries E401-0-0-0 and E401-0-0-511 are valid in table entries E401-0-0-0 to E401-0-0-511 included in target block T401-0-0, and the other table entries E401-0-0-1 to E401-0-0-510 are invalid.

In the explanation, suppose that the valid table entries E401-0-0-0 and E401-0-0-511 refer to data blocks B401-0-0-0 and B401-0-0-511, respectively, in the external memory 7.

In this case, the secure VMM 516 starts flush processing, determines target block T401-0-0 as flush target in Step S401, and executes the loop processing from Step S401 to Step S405 for all table entries E401-0-0-0 to E401-0-0-511 of table block T401-0-0 serving as the flush target.

First, in Step S402, the secure VMM 516 selects the valid table entry E401-0-0-0, and determines whether target block B401-0-0-0 of selected valid table entry E401-0-0-0 is stored in the external memory 7 or the internal memory 8. In this example, because target block B401-0-0-0 is supposed to be stored in the external memory 7 as described above, Steps S603 and S604 are not executed, and the secure VMM 516 starts processing for the next table entry E401-0-0-1. When the processing on the next table entry E401-0-0-1 is started, table entry E401-0-0-0 maintains the valid state and the state of referring to data block B401-0-0-0 in the external memory 7.

Because table entries E401-0-0-1 to E401-0-0-510 are in an invalid state, the processing in the loop is skipped.

Thereafter, the secure VMM 516 executes processing on selected valid E401-0-0-511 in the same manner as the above table entry E401-0-0-0. When the processing in the loop on table entry E401-0-0-511 is finished, table entry E401-0-0-511 maintains the valid state and the state of referring to data block B401-0-0-511 in the external memory 7.

After the loop processing is finished, in Step S406, the secure VMM 516 determines whether table block T401-0-0 as flush target has been updated.

When table block T401-0-0 as flush target has been updated, in Step S407, the secure VMM 516 calculates a MAC value used for verifying table block T401-0-0 as flush target, and stores the MAC value in table entry E402-0-0 in the MAC block T402-0.

In Step S408, the secure VMM 516 determines a write destination address in the external memory 7 for table block T401-0-0 as flush target.

In Step S409, the secure VMM 516 writes table block T401-0-0 as flush target and the MAC block T402-0-0 associated with table block T401-0-0 to the external memory 7.

In Step S410, the secure VMM 516 releases an area in the internal memory 8, and the flush processing is finished.

When table block T401-0-0 to be flushed has not been updated, after the determination in Step S406, the secure VMM 516 releases an area in the internal memory 8 without writing the MAC block T402-0-0 associated with table block T401-0-0 as flush target, and the flush processing is finished. Table block T401-0-0 and the MAC block T402-0-0 in the external memory 7 are maintained.

Accordingly, when the flush processing on table block T401-0-0 is finished, table entries E401-0-0-0 and E401-0-511 refer to data blocks B401-0-0-0 and B401-0-0-511, respectively, in the external memory 7, and the valid state is maintained. This is because the following processing is performed in the loop processing from Step S401 to S405 on the valid table entry. In Step S402, when the reference destination of the valid table entry is a target block in the internal memory 8, the flush processing on the target block in Step S403 and the invalidation processing on the table entry in Step S404 are performed. When the target block of the valid table entry exists in the external memory 7, specifically, when the target block is a data block in the non-secure OS 518, the table entry is maintained at the state of referring to the data block in the external memory 7 and the valid state, without the flush processing on the target block in Step S403 and the invalidation processing on the table entry in Step S404. Accordingly, the initial state of the table block that is set to directly refer to the external memory 7 is maintained without any change for the data in non-secure OS 518.

This is also effective in the case where part of a data block in the secure OS 517 is set to refer to a data block in the external memory 7 in the same manner as the case of the non-secure OS 518. For example, the above effect can be obtained also in the case where the secure OS 517 uses part of a virtual physical address space assigned for data exchange with the non-secure OS 518 or another secure OS, as a non-secure memory area.

(Relationship Between Structure of Information Processing Device 500 and Tree Verification Processing)

The tree verification processing described above and the structure of the information processing device 500 shown in FIG. 13 will be described in association with each other.

In step S201, the verification management unit 529 refers to the buffer area management unit 547 in the storage area management unit 535 so as to detect whether the verification storage unit 536 has a free area. When there is no free area, the verification management unit 529 requests, in step S202, the storage area management unit 535 to release an already-read buffer area and acquire a free-area address.

The buffer area management unit 547 that has received the request selects a replacement target from the verification storage unit 536 in accordance with the replacement algorithm, in Step S301. In this step, when the replacement target is a table block, the buffer area management unit 547 selects the table block and an associated block of the table block as flush targets. In Step S302, the buffer area management unit 547 selects one target from the flush targets, and requests the buffer write management unit 548 to execute flush processing.

The buffer write management unit 548 that has received the request executes the loop processing from Step S401 to Step S405, and checks whether the contents of the selected flush target have been updated. When the contents have not been updated, the processing goes to Step S410.

When the contents have been updated, in Step S407, the buffer write management unit 548 requests generation of a new MAC value for the flush target, based on the MAC value generation method defined by the MAC tree structure or the MAC+ counter structures. The verification information generation unit 531 generates a new MAC value.

In Step S408, the reference relation update unit 546 determines a write destination address from the translation list in the verification storage unit 536, and notifies the verification information generation unit 531 of the write destination address.

The verification information generation unit 531 transmits the flush target, data that requires writing, and the write destination address to the external write unit 534. In Step S409, the external write unit 534 performs writing to the external memory 7 based on the flush target and the write destination address. Thereafter, in Step S410, the reference relation update unit 546 rewrites the reference destination address of the corresponding table entry in the verification storage unit 536 as an address in the external memory 7, and invalidates the entry. Then, the buffer area management unit 547 deletes control information stored in the verification storage unit 536 and related to the flush target, to release the area of the verification storage unit 536 that stored the flush target.

The buffer area management unit 547 repeats selection of the flush target in Step S302 and the flush processing in Step S303, until all the selected rewrite targets are flushed from the verification storage unit 536.

When all the rewrite targets are flushed, a free area for the flushed data is generated in the verification storage unit 536.

In Step S203, the verification information acquisition unit 540 in the verification management unit 529 requests the external read unit 532 to read data to be used for verification. The external read unit 532 reads the requested data from the external memory 7, and transmits verification target data in the read data to the verification information calculation unit 541.

In Step S204, the verification information calculation unit 541 generates a MAC value of the read data based on the verification target data, by the MAC generation method defined by the MAC tree structure or the MAC+ counter structures. The falsification determination unit 539 compares the MAC value generated in advance with the MAC value calculated by the verification information calculation unit 541.

When the MAC values do not match and verification ends in failure in Step S205, the verification management unit 529 notifies in Step S206 the instruction execution unit 505 of failure in verification, and stops the subsequent processing.

When the MAC values match and verification succeeds in Step S205, the verification management unit 529 notifies the reference relation update unit 546 of success in reading. In Step S307, the reference relation update unit 546 writes the address of the verification target data in the verification storage unit 536, into the reference destination address of the invalid table entry. In this step the reference relation update unit 546 stores, in the verification storage unit 536, the address in the external memory 7 for the verification target data in buffer blocks.

(Table Reference Table and Data Reference Table)

The following is explanation of data verification processing in the non-secure OS 518 of the present embodiment.

For example, in the page table tree 9 in the external memory 7, the table entry of level N (Layer N) refers to data. The table entry of level N that refers to data in the external memory 7 is set to a valid state in advance. The data referred to by the non-secure OS 518 is stored in an address area assigned to the non-secure OS 518.

In the present embodiment, a plurality of table entries E0 to En included in the page table P refer to a plurality of tables T0 to Tn or data D0 to Dn. When the reference destinations of table entries E0 to En are tables T0 to Tn, the page table P is referred to as table reference table. When the reference destinations of table entries E0 to En are data D0 to Dn, the page table P is referred to as data reference table.

FIG. 17 is a data structure drawing illustrating an example of a reference state of a table entry included in the data reference table according to the present embodiment. With reference to FIG. 17, a description will be given in which data of the non-secure OS 518 is sent from the external memory 7 to the instruction execution unit 505 via cache memories 507*a* to 507*c*, without occurrence of fault or copy to the internal memory 8, and is not stored in the memory area in the internal memory 8.

Table reference tables T401 and T401-0 are stored in the internal memory 8. Data reference tables T401-0-0 and data B401-0-0-0 have not yet been stored in the internal memory 8. An example is explained in which data B401-0-0-0 in the non-secure OS 518 is referred to in this situation.

When table reference tables T401 and T401-0 are in a state of unverified page tables stored in the external memory 7, each table entry of table reference tables T401 and T401-0 is in an invalid state.

However, when data reference table T401-0-0 that refers to data B401-0-0-0 in the non-secure OS 518 is in a state of an unverified page table stored in the external memory 7, the table entry included in data reference table T401-0-0, such as table entry E401-0-0-0, is already the valid state if a memory area is assigned to the table entry.

When data reference table T401-0-0 is verified and copied into the internal memory 8, table entry E401-0-0 of table reference table T401-0 that refers to data reference table T401-0-0 is updated to refer to data reference table T401-0-0 in the internal memory 8, and further changed to the valid state.

When update of table entry E401-0-0 of table reference table T401-0 is finished, the MMU 506 can immediately settle the address of data B401-0-0-0. In the address settlement of data B401-0-0-0, table entry E401-0-0-0 of data reference table T401-0-0 is in a valid state when it is copied, and no page fault occurs.

In reference to data B401-0-0-0, table entry E401-0-0-0 refers to the address Eaddr (E401-0-0-0) in the external memory 7 at the time of reading. Accordingly, data B401-0-0-0 can be referred to without fault, as with the address settlement.

The reference to data B401-0-0-0 of the non-secure OS 518 is ordinary data reference. Data B401-0-0-0 is directly stored in cache memories 507*a* to 507*c* without being stored in the internal memory 8. It means that Data B401-0-0-0 is not stored in the memory area in the internal memory 8.

The read unit of cache memories 507*a* to 507*c* is a cache line that is smaller than a page. For this reason, reading for each cache line reduces the read time than reading for each page, prevents delay, and improves the memory usage efficiency.

(Valid State of Table Entry of Level N in Non-secure OS 518)

In the non-secure OS 518, a valid state is set to the table entry of the data reference table stored in the external memory 7.

In the present embodiment, the valid state of the table entry of the data reference table is maintained even when the data reference table is written back from the internal memory 8 to the external memory 7.

The data reference table of the non-secure OS 518 is not associated with a verifier of the referenced data. As a specific example, the page reference table T401-0 is associated with the verifier block T402-0. However, data reference table T401-0-0 for the non-secure OS 518 is not associated with a verifier of data B401-0-0-0.

(Structure of Secure Boot Loader 508*a* for Non-secure OS 518)

As an example of generating the page table 9 having the above characteristic, explained is initialization of the OS image by the secure boot loader 508*a*.

The secure boot loader 508a loads the boot image of the non-secure OS 518 into a predetermined memory area in the external memory 7. In addition, when the non-secure OS 518 is executed, the secure boot loader 508a generates the page table tree (page table of stage 2) 9 and the verifier tree 10, stores the page table tree 9 and the verifier tree 10 in the external memory 7, and ends the processing.

The secure boot loader 508a stores root verification information 13 of the secure page table tree 121 in the safe register 526.

In the present embodiment, because the non-secure OS 518 is allowed to be altered, falsification verification of the whole boot image of the non-secure OS 518 may not be executed. Falsification verification of the whole boot image of the non-secure OS 518 may be executed independently of generation of the page table tree 9 and the verifier tree 10.

FIG. 18 is a block diagram illustrating a second configuration of the information processing device 500 according to the present embodiment.

The information processing device 500 comprises a part read unit 552, a boot loader controller 553, a verification information generation unit 531, an external read unit 532, an external write unit 534, a storage area management unit 535, a verification storage unit 536, a key storage unit 513, and the external memory 7.

The storage area management unit 535 includes a reference relationship update unit 546, a buffer area management unit 547, and a buffer write management unit 548.

The part read unit 552 includes a header acquisition unit 554, and a signature information calculation unit 555.

The boot loader controller 553 includes a memory area controller 556, a page table initialization unit 558 including a reference destination determination unit 557, and a signature verification unit 559.

For example, the header acquisition unit 554 in the part read unit 552, the external read unit 532, and the external write unit 534 correspond to the external input/output unit 2 in FIG. 1.

For example, the signature information calculation unit 555 and the verification information generation unit 531 correspond to the verification calculation unit 4 of FIG. 1.

For example, the signature verification unit 559 corresponds to the verification unit 5 in FIG. 1.

For example, the memory area controller 556 and the storage area management unit 535 correspond to the update unit 6 and the replacement management unit 40 of FIG. 1.

For example, the page table initialization unit 558 corresponds to the initialization unit 42 of FIG. 1.

For example, the verification storage unit 536 corresponds to the internal memory 8 of FIG. 1.

Figure 19:
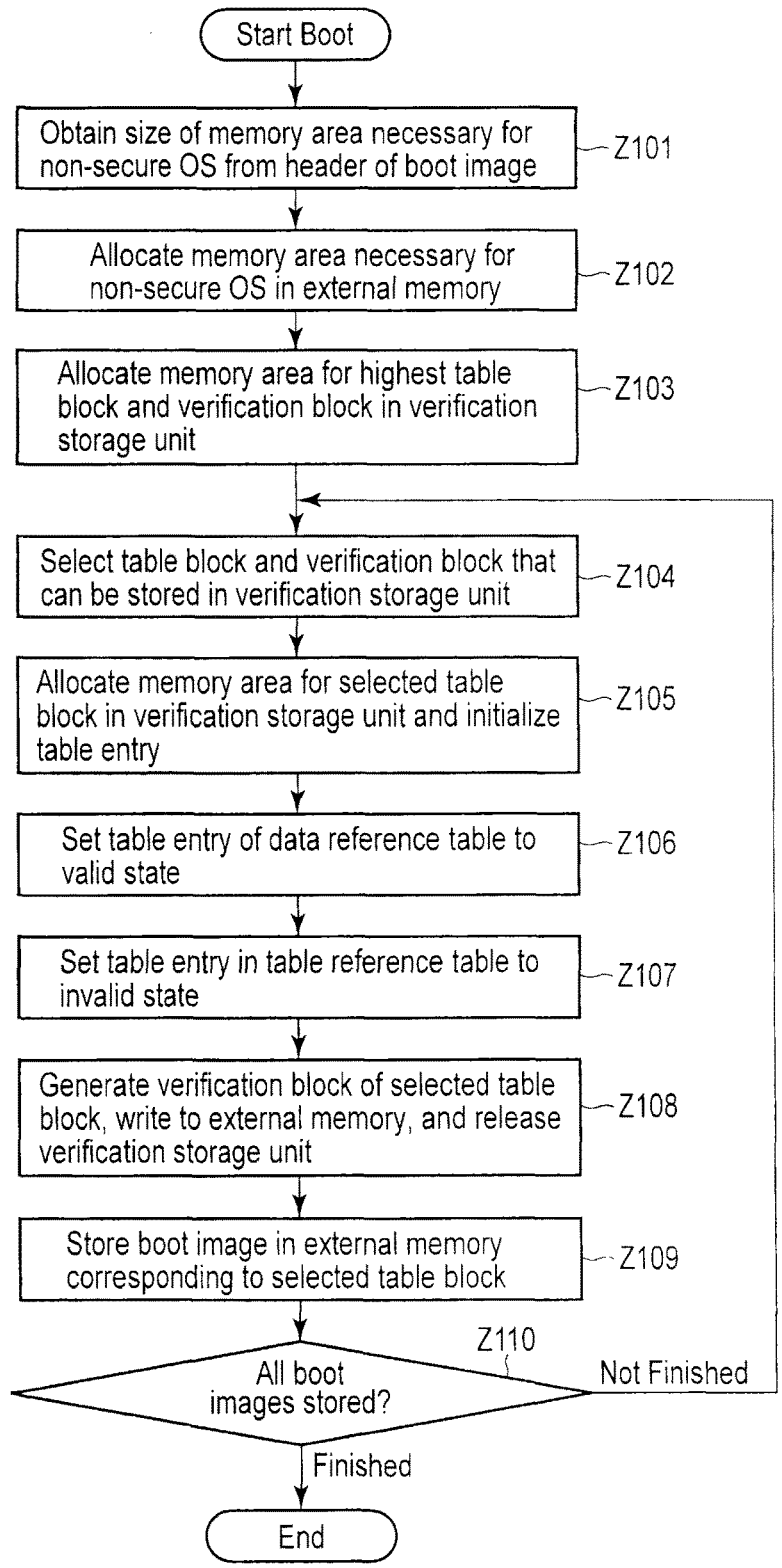
FIG. 19 is a flowchart showing an example of boot processing performed by the information processing device according to the second embodiment.

FIG. 19 is a flowchart illustrating boot processing performed by the information processing device 500 according to the present embodiment.

In Step Z101, the header acquisition unit 554 acquires the header of a boot image from the external memory 7 via the external read unit 532, and obtains information designating that the guest OS is the non-secure OS 518, and the size of the memory area, based on the header. The memory area controller 556 calculates a memory area of the page table tree 9 and the verifier tree 10 of the non-secure OS 518 that is necessary for stage-2 address translation in the external memory 7.

In Step Z102, the memory area controller 556 allocates a memory area of the size obtained by the calculation in the external memory 7 managed by the secure VMM 516.

Next, the page table initialization unit 558 starts generation of the page table tree 9 and the verifier tree 10 that define correlation between an intermediate physical address area and physical addresses requested by the non-secure OS 518.

In Step Z103, the page table initialization unit 558 allocates a memory area for the highest page block T401 and a verification block T402 associated with table block T401 in the verification storage unit 536, via the buffer area management unit 547. Verifiers of table blocks T401-0 to T401-3 and verification blocks T402-0 to T402-3 referred to by table entries E401-0 to E401-3 included in table block T401 are stored in verification block T402.

In Step Z104, the page table initialization unit 558 selects table blocks T401-0 to T401-3 having a size that can be stored in the verification storage unit 536, and verification blocks T402-0 to T402-3 associated with table blocks T401-0 to T401-3, via the buffer area management unit 547.

In Step Z105, the page table initialization unit 558 allocates a memory area for selected table blocks T401-0 to T401-3 and verification blocks T402-0 to T402-3 in the verification storage unit 536, via the buffer area management unit 547. The page table initialization unit 558 writes addresses Eaddr (T401-0) to Eaddr (T401-3) of table blocks T401-0 to 1401-3 in the external memory 7 and other field information in table entries E401-0 to E401-3 of table block T401, via the reference relationship update unit 546.

In this manner, the memory area for table blocks T401-0 to T401-3 and verification blocks T402-0 to T402-3 of level 2 is allocated, the memory area for table block T401 and verification block T402 of level 1 is allocated, and table entries E401-0 to E401-3 are initialized.

By similar processing, the page table initialization unit 558 allocates the memory area for table blocks T401-0-0 to T401-3-511 of level 3, and initializes table entries E401-0-0 to E401-3-511 included in table blocks T401-0 to T401-3 of level 2.

For example, when the table blocks of level 3 exist from T401-0-0 to T401-3-511, the whole table blocks T401-0-0 to T401-3-511 of level 3 include 2048 blocks and have a size of 8192 kilobytes. In this case, when the whole size of the verification storage unit 536 is 1 megabyte, the table blocks of level 3 cannot be stored in the verification storage unit 536.

For this reason, in the present embodiment, the table blocks of level 3 are divided into groups, for example, each including 32 blocks, memory areas for the groups are allocated one after the other in the verification storage unit 536 and the external memory 7, initialization is performed, and the table blocks in the verification storage unit 536 are written into the external memory 7.

In this case, the buffer area management unit 547 and the memory area controller 556 allocates 128 memory areas of 512 kilobytes for table blocks T401-0-0 to T401-0-127 that belong to the first group among table blocks T401-0-0 to T401-0-511 referred to by table block T401-0, in the verification storage unit 536 and the external memory 7.

In addition, the memory area controller 556 allocates a memory area of data referred to by table blocks T401-0-0 to T401-0-127 that belong to the first group, in the external memory 7.

Because the data of the non-secure OS 518 is not a verification target, the memory area for the data of the non-secure OS 518 is not allocated in the verification storage unit 536. It is unnecessary to use verifiers of the data referred to by table blocks T401-0-0 to T401-3-511 of three layers for the non-secure OS 518.

Next, the page table initialization unit 558 writes addresses Eaddr (B401-0-0-0) to Eaddr (B401-0-127-511)

of the data referred to by table blocks T401-0-0 to T401-0-127 that belong to the first group in the external memory 7 to corresponding page entries E401-0-0-0 to E401-0-127-511, writes the other field information therein, and performs initialization.

In Step Z106, the reference destination determination unit 557 determines that table blocks T401-0-0 to T401-0-127 that belong to the first group are data reference tables, and the page table initialization unit 558 sets the valid/invalid flag of table entries E401-0-0-0 to E401-0-127-511 of table blocks T401-0-0 to T401-0-127 of level 3 referring to data B401-0-0-0 to B401-0-127-511 to a valid state, via the reference relationship update unit 546, as described above.

At this stage, initialization of table entries E401-0-0-0 to E401-0-127-511 of table blocks T401-0-0 to T401-0-127 that belong to the first group is finished.

In Step Z107, the reference destination determination unit 557 determines that table block T401-0 of level 2 is a table reference table. In this case, the page table initialization unit 557 sets the valid/invalid flags of table entries E401-0-0 to E401-0-127 of table blocks T401-0-0 to T401-0-127 to an invalid state, different from table entries T401-0-0 of table blocks T401-0-0 to T401-0-127 of level 3.

In Step Z108, the verification buffer write unit 548 of the storage area management unit 535 requests the verification information generation unit 531 to calculate verifiers for table blocks T401-0-0 to T401-0-127 that belong to the first group that has been initialized, among table blocks T401-0-0 to T401-3-511 of level 3. The verification information generation unit 531 calculates verifiers for table blocks T401-0-0 to T401-0-127 that belong to the first group. Then, the external write unit 534 writes table blocks T401-0-0 to T401-0-127 that belong to the first group to the external memory 7. The buffer area management unit 547 changes the buffer areas of the verification storage unit 536 that stored the written table blocks T401-0-0 to T401-0-127 to free areas. The reference relationship update unit 546 writes the addresses Eaddr (T401-0-0) to Eaddr (T401-0-127) of table blocks T401-0-0 to T401-0-127 that belong to the first group in the external memory 7 to table entries E401-0-0 to E401-0-127 of table block T401-0 of level 2, and set other field information in table entries E401-0-0 to E401-0-127.

The buffer area management unit 547 and the memory area controller 556 allocates memory areas for table blocks T401-0-128 to T401-0-255 that belong to the second group, among table blocks T401-0-0 to T401-0-511 of level 3 referred to by table block T401-0, in the verification storage unit 536 and the external memory 7. The page table initialization unit 558 initializes table blocks T401-0-128 to T401-0-255 that belong to the second group, by processing similar to the above.

The buffer area management unit 547, the memory area controller 556, and the page table initialization unit 557 repeat similar processing for table blocks T401-0-256 to T401-0-383 that belong to the third group, and table blocks T401-0-384 to T401-0-511 that belong to the fourth group.

As a result, all table blocks T401-0-0 to T401-0-511 of level 3 referred to by table block T401-0 of level 2 are initialized.

When all table blocks T401-0-0 to T401-0-511 of level 3 are initialized, selected table block T401-0 becomes able to be written out.

The buffer write management unit 548 requests the verification information generation unit 531 to calculate a verifier for table block T401-0 that has been initialized. The verification information generation unit 531 calculates a verification block T402-0 for table block T401-0. Then, the external write unit 534 writes table block T401-0 and verification block T402-0 to the external memory 7. The buffer area management unit 547 changes the buffer area of the verification storage unit 536 that stored the written table block T401-0 to a free area. The reference relationship update unit 546 writes the address Eaddr (T401-0) of table block T401-0 in the external memory 7 to table entry E401-0 of table block T401 of level 1, and sets other field information in table entry E401-0.

Similar processing is repeated for selected table blocks T401-1 and T401-2, and the table blocks are written to the external memory 7.

In Step Z109, the memory area controller 556 stores the boot image of the non-secure OS 518 in a memory area in the external memory 7 that is referred to via selected table blocks T401-1 and T401-2.

In Step Z110, the page table initialization unit 558 determines whether all the table blocks for the boot image of the non-secure OS 518 have been selected and stored in the memory area in the external memory 7. When any table block has not been selected, the processing returns to Step Z104. When the above processing is repeated until all the table blocks are selected, all the table blocks are initialized and stored in the external memory 8.

In the above processing, when the table block in the verification storage unit 536 is written into the external memory 7, a verification block associated with the table block may be also written into the external memory 7 in synchronization.

In the present embodiment, the part read unit 552 may read partial boot images obtained by dividing the boot image of the secure OS 517 in the external memory 7. In this case, the signature information calculation unit 555 generates signature information of the partial boot image. The signature verification unit 559 performs signature verification, based on signature information included in the header of the boot image of the secure OS 517 and signature information calculated based on the partial boot image. The part read unit 552, the signature information calculation unit 555, and the signature verification unit 559 will be explained in detail later.

In the present embodiment explained above, when the non-secure OS 518 is booted, data in the external memory 7 into the internal memory 8, although a memory area is allocated for data such as the boot image and the data is written in the external memory 7. This structure enables startup of the non-secure OS 518 without influence of data falsification in the external memory 7.

The present embodiment enables safe generation of the secure page table tree 121 and the secure verifier tree 122 for the non-secure OS 518.

The present embodiment enables detection of falsification by verification based on the secure verifier tree 122, when the table block that has been written in the external memory 7 is read into the internal memory 8.

In the present embodiment, falsification verification using the secure verifier tree 122 is performed on the secure page table tree 121 for the non-secure OS 518, and not performed on the data. This structure enables to protect the data of the secure VMM 516 and the secure OS 517 to be subjected to falsification verification from rewriting on the non-secure OS 518.

Setting of the page table in which no verification is performed on certain data blocks is also applicable to part of data stored in the virtual physical address space of the secure OS 517. For example, in the case where the secure OS 517 and the non-secure OS 518 have a shared data area that can be mutually read and written to, when all the data serve as verification target in reading by the secure OS 517, reading of the data by the secure OS 517 always ends in failure due to failure in verification, because no verifiers are written in data writing by the non-secure OS 518. To avoid this problem, when the secure OS 517 allocates new data after load of the boot image by secure boot in the third embodiment described later, the secure OS 517 can select a secure memory to allocate a data area on the internal memory 8 to incorporate it into the secure page table tree 121 not to fail in verification of reading in the internal memory 8, and a non-secure memory to set the secure page table tree 121 to directly refer to the data allocated in the external memory 7.

In the present embodiment, falsification verification using the secure verifier tree 122 is performed on the secure page table tree 121 for the non-secure OS 518, and not performed on the data. This structure enables to protect the data of the secure VMM 516 and the secure OS 517 to be subjected to falsification verification from rewriting on the non-secure OS 518.

The protection is effective also against the case where the guest OSs include only non-secure OS 518, and include no secure OS 517.

For example, in the case where different user companies operate a plurality of guest OSs with a shared secure VMM 516 using the information processing device 500, information may leak between the user companies when unauthorized falsification of the secure page table tree 121 occurs. Even when the information processing device 500 is strictly managed and no malicious attacks occur on the physical memory, information may leak due to memory error caused by a natural phenomenon. The probability of occurrence of information leak due to memory error caused by a natural phenomenon can be reduced by introduction of an error-correcting memory such as an ECC (Error Correcting Code). However, error-correcting memories are expensive. In addition, it is required to provide the whole main memory with an error-correcting function, to strictly prevent unauthorized falsification and information leak.

By contrast, verification using the secure verifier tree 122 according to the present embodiment enables to protect the guest OS and the secure VMM 516 from memory errors at low cost, without introduction of an expensive error-correcting memory.

In the present embodiment, no verification is executed when data of the non-secure OS 518 is referred to. Unverified data is not read into the internal memory 8. Accordingly, the size of the unverified data may be larger than the size of the internal memory 8. For example, when the guest OSs have the same memory size, increasing the size of the data reduces the size of the page table tree 9 and the secure page table tree 121, and improves the use efficiency of the internal memory 8. This structure improves the performance of the information processing device 500.

As explained for the above fourth condition, even for the memory assigned to the secure OS 517, it is necessary to read the memory contents rewritten from the exterior, when there is an input from the area mapped in hardware used for communications with the exterior, or communications with an another OS via the memory. Because verification ends in failure in such cases, it is necessary to perform setting to ignore verification. Specifically, a setting for a part of the memory area in the secure OS 517 may be similar to the setting for the non-secure OS 518, based on the premise that the OS is properly used in the input/output processing.

[Third Embodiment]

In a present embodiment, a modification of the boot processing according to the above second embodiment will be explained hereinafter.

When the information processing device 500 is started for the first time or reinstalled, the secure boot loader 508*a* reads the boot image of the guest OS, stores the page table tree 9 and the verifier tree 10 having mutually matched data structures in the external memory 7, and stores the secure page table tree 121 and the secure verifier tree 122 having mutually matched data structures in the internal memory 8.

The secure boot loader 508*a* does not execute the guest OS, but finishes the processing at the time of finishing generation of the page table tree 9, the verifier tree 10, the secure page table tree 121 and the secure verifier tree 122.

Thereafter, the regularly operating secure VMM 516 takes over the page table tree 9, the verifier tree 10, the secure page table tree 121, the secure verifier tree 122, and the guest OS image, and controls the guest OS.

The guest OS boot image is an image for boot, and stored in, for example, the external memory 7. The guest OS boot image is accessed only in boot, and is not accessed for each word. The guest OS boot image may be stored in the external device 503.

(Management of Initialization State of Page Table)

In the present embodiment, the secure boot loader 508*a* manages initialization state information (flag) that designates the generation state of the page table tree 9 and the verifier tree 10 in startup. The initialization state information is preferably managed in, for example, a free area of the table entry included in the page table.

Because the secure boot loader 508*a* and the secure VMM 516 can deal with flags, the MMU 506 serving as existing hardware may not be able to recognize the initialization state information.

The initialization state information designates one of the state "available" and the state "not available".

In the following explanation, suppose that data B401-0-0-0 to B401-0-0-511, and B401-0-1-0 to B401-0-1-511 serve as the boot images of the guest OS.

In the present embodiment, the page table tree 9 and the verifier tree 10 may be generated for each guest OS.

The secure boot loader 508*a* obtains the physical address in which the page table tree 9 and the verifier tree 10 of the guest OS are stored, and the address area of the guest OS. The secure boot loader 508*a* also obtains the intermediate physical address of the guest OS.

To load the boot image of the guest OS, the secure boot loader 508*a* selects the first boot image B401-0-0-0, allocates a memory area for the page table and a verifier necessary for address translation of the boot image B401-0-0-0 in the internal memory 8, and also allocates a memory area in the external memory 7. At the time when a table entry in the child table is generated, the secure boot loader 508*a* sets the information "available" in the initialization state information included in the table entry in the parent table.

Figure 20:
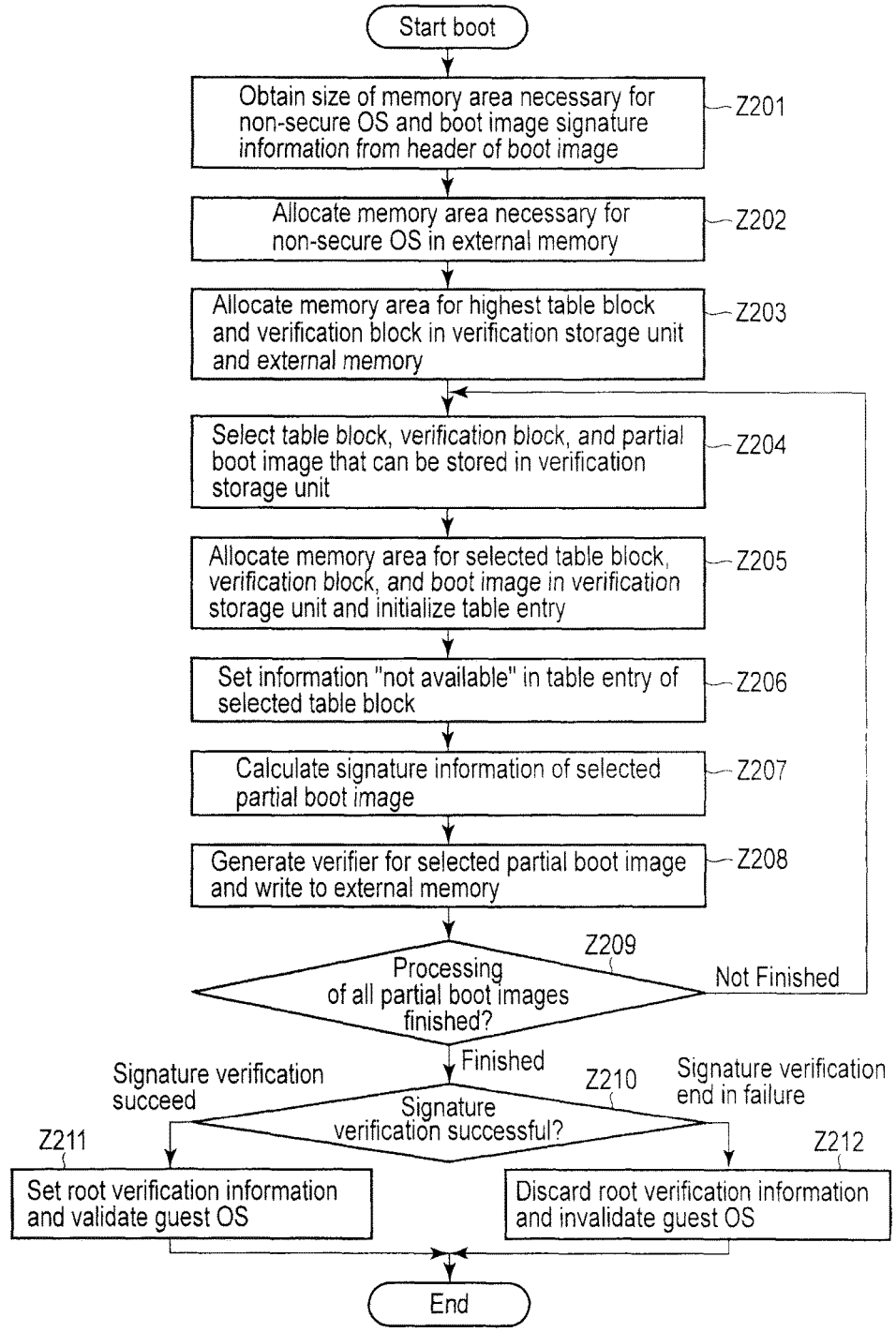
FIG. 20 is a flowchart showing an example of boot processing performed by the information processing device according to a third embodiment.

FIG. 20 is a flowchart illustrating boot processing performed by the information processing device according to the present embodiment. The processing in FIG. 20 will be explained hereinafter using the configuration of the information processing device 500 illustrated in FIG. 18.

In Step Z201, the header acquisition unit 554 acquires the header of the boot image from the external memory 7 via the external read unit 532, and obtains the size of the memory area and the boot image signature information of the guest OS, based on the header of the boot image. The memory area controller 556 calculates the memory area for the page table tree 9 and the verifier tree 10 of the guest OS necessary for address translation of stage 2 in the external memory 7.

In Step Z202, the memory area controller 556 allocates a memory area of the size obtained by calculation, in the external memory 7 managed by the secure VMM 516.

In Step Z203, the page table initialization unit 558 allocates a memory area for the highest table block T401 and verification block T402 in the address Eaddr (T401) in the external memory 7, via the part reading unit 552 and the external read unit 532, allocates a memory area for the highest table block T401 and verification block T402 in the address Iaddr (T401) of the memory area in the verification storage unit 536, and stores correlation between the address Iaddr (T401) of the memory area in the verification storage unit 536 and the address Eaddr (T401) of the unverified page table in the external memory 7 in the work area of the secure VMM 516.

In Step Z204, the page table initialization unit 558 selects table blocks T401-0 to T401-3 having a size that can be stored in the verification storage unit 536 via the buffer area management unit 547, and selects selected table blocks T401-0 to T401-3, verification blocks T402-0 to T402-3 associated with selected table blocks T401-0 to T401-3, and partial boot images referred to via selected table blocks T401-0 to T401-3.

In Step Z205, the page table initialization unit 558 allocates memory areas for selected table blocks T401-0 to T401-3, selected verification blocks T402-0 to T402-3, and the selected partial boot images in the verification storage unit 536 via the buffer area management unit 547. The page table initialization unit 558 initializes each of table entries E401-0 to E401-3 of table block T401 referring to selected table blocks T401-0 to T401-3 in the verification storage unit 536, via the reference relationship update unit 546.

In Step Z206, the page table initialization unit 558 sets the information "not available" in the initialization state information of each of table entries E401-0 to E401-3, via the reference relationship update unit 546.

The boot loader controller 553 and the storage area management unit 535 successively initialize the page table T401-0 of level 2 and the page table T401-0-0 of level 3 that are necessary for translating the address of partial boot image B401-0-0-0 in the external memory 7 and the internal memory 8 in the same manner.

When initialization of the page table 401-0 of level 2 is finished, the boot loader controller 553 and the storage area management unit 535 write the address Eaddr (T401-0) into table entry E401-0 of the page table T401 of level 1 that refers to the page table T401-0 of level 2 in the external memory 7, and writes the address Iaddr (T401-0) in the internal memory 8. The same processing is performed on table entry E401-0-0 of the page table T401-0-0 of level 3 and the page table T401-0 of level 2.

When the above setting is finished, the page table initialization unit 558 sets the address Iaddr (T401) in the register 526.

In Step Z207, the signature information calculation unit 555 of the part reading unit 552 loads partial boot image B401-0-0-0 to be verified first into the boot image buffer of the verification storage unit 536 via the external read unit 532, and calculates a hash value (signature information) for performing verification based on the boot image signature information included in the header of the boot image. For example, the hash value is calculated by encryption processing hardware included in the secure DMA controller 511, in parallel with data transfer by the secure DMA controller 511. The intermediate data of hash calculation is stored in the register of the secure DMA controller 511. Although access to the register from the secure VMM 516 is allowed, access to the register from other constituent elements is prohibited. For example, the signature information calculation unit 555 prepares memory areas for the partial boot images of 512 kilobytes i.e. 128 pages in the verification storage unit 536, to store partial boot images B401-0-0-0 to B401-0-0-127 for which hash calculation for signature calculation has been finished.

In Step Z208, the verification buffer writer 548 transmits partial boot images B401-0-0-0 to B401-0-0-127 to the verification information generation unit 531, to perform hash calculation on the next partial boot images B401-0-0-128 to B401-0-0-255. The verification information generation unit 531 calculates verifiers M402-0-0-0 to M402-0-0-127 for verifying partial boot images B401-0-0-0 to B401-0-0-127. The external writing unit 534 writes partial boot images B401-0-0-0 to B401-0-0-127 to the corresponding memory areas in the external memory 7. The buffer area management unit 547 releases the memory areas for partial boot images B401-0-0-0 to B401-0-0-127 in the verification storage unit 536. The secure DMA controller 511 is used also for calculation of the verifiers M402-0-0-0 to M402-0-0-127 of partial boot images B401-0-0-0 to B401-0-0-127.

The page table initialization unit 558 sets the information "available" in the initialization state information of the table entry that refers to the released memory areas, via the reference relationship update unit 546.

The secure boot loader 508a repeats hash calculation for partial boot images B401-0-0-128 to B401-0-0-255, calculation and writing of the verifiers, hash calculation for partial boot images B401-0-0-256 to B401-0-0-383, calculation and writing of the verifiers, hash calculation for partial boot images B401-0-0-384 to B401-0-0-511, and calculation and writing of the verifiers, and sets the information "available" in all the initialization state information of the table entries of table block T401-0-0. In this manner, initialization of table block T401-0-0 is finished.

Thereby, the secure boot loader 508a is enabled to write table block T401-0-0, and calculate and write verification block T402-0-0. The secure boot loader 508a writes table block T401-0-0 and verification block T402-0-0, and sets the information "available" in the initialization state information of table entry E401-0-0 of table block T401-0 serving as the reference source of table block T401-0-0 to be written.

Similar processing to that on partial boot images B401-0-0-0 to B401-0-0-511 is executed on the next partial boot images B401-0-1-0 to B401-0-1-511. Specifically, the secure boot loader 508a allocates memory areas for table block T401-0-1 that refers to partial boot images B401-0-1-0 to B401-0-1-511, verification block T402-0-1, and partial boot images B401-0-1-0 to B401-0-1-511, and performs reading, hash calculation, and verifier calculation of partial boot images B401-0-1-0 to B401-0-1-511, writing of partial boot images B401-0-1-0 to B401-0-1-511, and setting of initialization state information of the corresponding table entry E401-0-1, as processing similar to the above.

When the above processing is finished, the secure boot loader 508a is enabled to write table block T401-0-1, and calculate and write verification block T402-0-1.

In Step Z209, the secure boot loader 508a determines whether the processing of the above steps Z204 to 2208 has been executed on all the partial boot images.

When the above steps 2204 to 2208 have not been executed on all the partial boot images, the processing goes to Step Z204. As described above, by repeating the above processing, the secure boot loader 508a successively calculates the hash values for all the partial boot images, successively updates intermediate data of the verifier for the whole boot image, and generates in the end a hash value necessary for signature verification of the above file header. In many cases, a single hash value is used for single boot image verification, and calculation of the hash value for the boot image is successively performed. When the hash value of the signature of the boot image is divided into parts in advance to be supplied to respective parts, a plurality of hash values are calculated in accordance with the division.

In Step Z210, the signature verification unit 559 performs signature verification, based on the boot image signature information obtained from the header acquisition part 554 and the calculated hash value of the partial boot image.

When the result of the signature verification designates success, in Step Z211, the signature verification unit 559 stores the root verification information in a safe storage device such as the key storage unit 513, and sets information "valid" in information designating whether the guest OS is valid or not. The external memory 7 stores all the page tables and verifier tables up to the highest level. Thereafter, the secure boot loader 508*a* ends the processing.

When the result of the signature verification designates failure, in Step S212, the signature verification unit 559 discards the root verification information 13, sets information "invalid" in the information designating whether the guest OS is valid or invalid, and invalidates the generated page table tree 9 and the verifier tree 10. Then, the secure boot loader 508*a* ends the processing.

The boot image loaded into the external memory 8 by the above processing, the page table tree 9 used for address translation for the boot image, and the verifier tree 10 for verification of the boot image and the page table tree are read from the external memory 7, verified by the secure VMM 516, and stored in the internal memory 8. This structure enables safe execution of the boot image, and provision of the service of the guest OS.

The present embodiment has the structure of managing the initialization state information. This structure enables to increase the speed of startup of the information processing device 500, because the service of the guest OS is able to be started even when the memory area that may be used by the guest OS in the future includes an uninitialized part.

In the present embodiment, the secure boot loader 508*a* is stored in the mask ROM 508 in the processor 501, subjected to secure boot, and stored in the internal memory 8. The secure boot loader 508*a* performs verification to prevent falsification of the boot image of the guest OS. For example, signature information of the boot image is attached to a large-sized part such as the whole boot image. The size of the guest OS boot image is generally much larger than the size of the safe internal memory 8. For this reason, it is physically impossible to read the whole boot image of the guest OS into the internal memory 8, to perform signature verification of the boot image of the guest OS. When the boot image of the guest OS is divided to be read for signature calculation of the boot image of the guest OS, a partial boot image that has already been subjected to signature calculation and stored in the external memory 7 may be altered. However, in the present embodiment, part of the boot image of the guest OS is read, the secure page table tree 121 and the secure verifier tree 122 are generated for the read partial boot image, to enable detection of falsification of the partial boot image that has been read among the boot image of the guest OS in the external memory 7. This structure enables safe signature verification of the boot image of the guest OS, even when the size of the internal memory 8 is limited, and prevents falsification of the boot image of the guest OS after signature verification. In addition, because signature verification in boot is performed in parallel with generation of the page table tree 9 and the verifier tree 10, the boot time is shortened in comparison with the case of performing each of them separately.

The present embodiment enables start of the processing of the guest OS, even when part of the page table tree 9 and the verifier tree 10 is uninitialized.

Specifically, in the present embodiment, in spite of startup of the guest OS to which an enormous memory area is assigned, the guest OS can be operated readily, as long as necessary part of the assigned memory area has been initialized and necessary parts of the page table tree 9 and the verifier tree 10 have been generated, and the startup time can be further shortened.

Although no page table has been generated for the uninitialized part, the highest table entry for the uninitialized page table designates information "not available". Verifiers can protect the page table including the highest table entry for the uninitialized page table and page tables higher than the page table. This structure prevents the attacker from altering the state of the highest table entry for the uninitialized page table. Accordingly, the present embodiment enables protection from attacks inserting unauthorized data into the uninitialized memory area.

For example, when the guest OS is going to use an intermediate physical address in which initialization state information designating "not available" is set, the guest OS may explicitly issue a request of initializing the intermediate physical address area to the secure VMM 516. In such a case, the secure VMM 516 that has received the initialization request allocates memory areas in the external memory 7 and the internal memory 8, initializes the memory areas to store the data with a predetermined initialization value of 0, and generates the page table tree 9 and the verifier tree 10 by processing similar to load of the boot image by the secure boot loader 508*a*.

In the above embodiment, the boot image stored in the external memory 7 or the external device 503 is copied into another memory area. However, the boot image stored in the external memory 7 or the external device 503 may be directly mapped for each page in the intermediate physical address assigned to the guest OS. This structure reduces data copy processing. In such a case, although the data reference processing is similar to the above processing, the write processing can be performed by writing only verifiers, without writing the page table. Omission of the data copy enables reduction in the boot time.

In the present embodiment, using initialization state information prevents reading of a page table or data from an uninitialized memory area due to malfunction of the guest OS itself, in addition to prevention of falsification of an uninitialized memory area. For example, when reading is performed on a page table having initialization state information designating "not available" due to malfunction of the guest OS itself, the malfunction can be detected by the secure VMM 516 notifying the guest OS thereof.

The information processing device 500 may execute memory test prior to boot of the guest OS. When the page table tree 9 and the verifier tree 10 are generated in memory test prior to boot of the guest OS, the above effect of malfunction detection cannot be obtained. Therefore, the page table tree 9 and the verifier tree 10 may not be generated in memory test in the present embodiment. In addition, in the case of executing a memory test, the initialization state information may include additional information designating that the memory test has been finished and the guest OS image has not been loaded, to detect access to an uninitialized page table or uninitialized data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory management device comprising:
   a processor, the processor configured to:
   execute reading and writing for a first storage, the first storage storing a table tree including a parent table and a child table, and a verifier tree including a parent verifier associated with the parent table and a child verifier associated with the child table, the parent verifier being used for verifying the child table and the child verifier;
   translate a first address into a second address, based on a secure table tree which is a part of the table tree and is stored in a secure second storage, the secure second storage storing a secure verifier tree which is a part of the verifier tree;
   calculate verification information, when a first child table included in the table tree and needed for translating the first address into the second address is not included in the secure table tree, based on the first child table in the table tree and a first child verifier included in the verifier tree and associated with the first child table;
   execute verification, based on the verification information and a first parent verifier included in the secure verifier tree and associated with a first parent table referring to the first child table;
   determine whether a type of an operating system which requests allocation of a storage area of new data requires security; and
   incorporate the first child table and the first child verifier into the secure table tree and the secure verifier tree, respectively, when a result of the verification designates validity,
   wherein the processor, when it is determined which the operating system does not require security, sets the second address in the secure table tree such that the second address designates the new data stored in the first storage, and sets a valid state in an entry referring to the new data in the first child table.

2. The memory management device according to claim 1, wherein
   the processor sets the second address in the secure table tree to selectively designate one of a storage position in the first storage and a storage position in the second storage, when the processor determines which the operating system requires security.

3. The memory management device according to claim 1, wherein
   a header attached to an image of the operating system includes information designating the type of the operating system, and
   the processor determines whether the operating system requires security, based on the header attached to the image of the operating system.

4. The memory management device according to claim 1, wherein the processor
   sets a valid state in an entry which designates the second address in the table tree stored in the first storage,
   sets an invalid state in an upper entry for the entry in the table tree,
   maintains the valid state of the entry designating the second address in the secure table tree, when the entry which designates the second address in the table tree is stored from the first storage into the second storage, and
   changes the upper entry in the secure table tree from the invalid state to the valid state, when the upper entry is stored from the first storage into the second storage.

5. The memory management device according to claim 1, wherein
   the processor successively obtains a selected partial boot image among a boot image of the operating system from the first storage, in boot processing of the operating system,
   the processor successively updates intermediate data of the selected partial boot image for calculating a first verifier for the boot image, and generates a second verifier for verification of a table and data necessary for referring to the selected partial boot image, and
   the processor successively stores the second verifier of the table in the second storage, and incorporates the table necessary for referring to the selected partial boot image in the second storage and the second verifier for verification of the table into the table tree and the verifier tree in the first storage.

6. The memory management device according to claim 5, wherein
   a boot image header attached to the boot image includes signature information of the boot image,
   the processor successively updates intermediate data necessary for signature calculation of entire boot image based on data of the selected partial boot image, and
   the processor performs verification, based on the signature information of the boot image header and signature information obtained as a result of successive signature calculation on the entire boot image.

7. The memory management device according to claim 5, wherein the processor is further configured to
   set information designating which an initialization state is finished in an entry of the incorporated table, when the table necessary for referring to the selected partial boot image is incorporated into the table tree in the first storage.

8. A memory management device comprising a processor, the processor configured to:
   execute reading and writing for a first storage, the first storage storing a table tree including a parent table and a child table, and a verifier tree including a parent verifier associated with the parent table and a child verifier associated with the child table, the parent verifier being used for verifying the child table and the child verifier;
   translate a first address into a second address, based on a secure table tree which is a part of the table tree and is stored in a secure second storage, the secure second storage storing a secure verifier tree which is a part of the verifier tree;
   calculate verification information, when a first child table included in the table tree and needed for translating the first address into the second address is not included in the secure table tree, based on the first child table in the table tree and a first child verifier included in the verifier tree and associated with the first child table;

execute verification, based on the verification information and a first parent verifier included in the secure verifier tree and associated with a first parent table referring to the first child table; and incorporate the first child table and the first child verifier into the secure table tree and the secure verifier tree, respectively, when a result of the verification designates validity, wherein the processor sets a valid state in an entry which designates the second address in the table tree stored in the first storage, sets an invalid state in an upper entry for the entry in the table tree, maintains the valid state of the entry designating the second address in the secure table tree, when the entry which designates the second address in the table tree is stored from the first storage into the second storage, and changes the upper entry in the secure table tree from the invalid state to the valid state, when the upper entry is stored from the first storage into the second storage.

9. A non-transitory computer readable recording medium storing a program which is executed by a computer, the program configured to:

execute reading and writing for a first storage, the first storage storing a table tree including a parent table and a child table, and a verifier tree including a parent verifier associated with the parent table and a child verifier associated with the child table, the parent verifier being used for verifying the child table and the child verifier;

translate a first address into a second address, based on a secure table tree which is a part of the table tree and is stored in a secure second storage, the secure second storage storing a secure verifier tree which is a part of the verifier tree;

calculate verification information, when a first child table included in the table tree and needed for translating the first address into the second address is not included in the secure table tree, based on the first child table in the table tree and a first child verifier included in the verifier tree and associated with the first child table;

execute verification, based on the verification information and a first parent verifier included in the secure verifier tree and associated with a first parent table referring to the first child table;

determine whether a type of an operating system which requests allocation of a storage area of new data requires security; and incorporate the first child table and the first child verifier into the secure table tree and the secure verifier tree, respectively, when a result of the verification designates validity, wherein the program, when it is determined which the operating system does not require security, sets the second address in the secure table tree such that the second address designates the new data stored in the first storage, and sets a valid state in an entry referring to the new data in the first child table.

\* \* \* \* \*